(12) United States Patent
Brunner et al.

(10) Patent No.: US 8,488,958 B2
(45) Date of Patent: Jul. 16, 2013

(54) SCENE ADAPTIVE AUTO EXPOSURE

(75) Inventors: Ralph Brunner, Cupertino, CA (US); Frank Doepke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 229 days.

(21) Appl. No.: 12/786,710

(22) Filed: May 25, 2010

(65) Prior Publication Data

US 2011/0293259 A1    Dec. 1, 2011

(51) Int. Cl.
G03B 7/00 (2006.01)
G03B 3/10 (2006.01)
G03B 13/34 (2006.01)
H04N 5/235 (2006.01)

(52) U.S. Cl.
USPC ............ 396/236; 396/122; 396/123; 396/233

(58) Field of Classification Search
USPC .. 396/213, 236, 121–123, 233, 234; 348/345, 348/350, 362
See application file for complete search history.

(56) References Cited

U.S. PATENT DOCUMENTS

| | | | |
|---|---|---|---|
| 5,703,644 A * | 12/1997 | Mori et al. | 348/363 |
| 5,724,456 A | 3/1998 | Boyack et al. | |
| 6,795,502 B2 | 9/2004 | Fert et al. | |
| 2003/0025599 A1 | 2/2003 | Monroe | |
| 2003/0165258 A1 | 9/2003 | Kubota et al. | |
| 2007/0223908 A1 * | 9/2007 | Sakamoto | 396/234 |

OTHER PUBLICATIONS

Papadimitriou, Theophilos, et al., "Video Scene Segmentation Using Spatial Contours and 3-D Robust Motion Estimation", IEEE Transactions on Circuits and Systems for Video Technology, vol. 14 No. 4, pp. 485-497, (Apr. 2004).
Nikon/Imaging Products/Scene Recognition System, http://imaging.nikon.com/products/imaging/technology/scene/19/index_02.htm, 3 pages (May 2010).
Nikon/Imaging Products/Exposure Metering, http://imaging.nikon.com/products/imaging/technology/scene/14/index.htm, 4 pages (May 2010).
Nikon D3s/D3x, "Proven Speed and Accuracy", http://imaging.nikon.com/products/imaging/lineup/microsite/d3s_d3x/en/speed_accuracy/, 7 pages (May 2010).
Nikon/3D Color Matrix Metering II, http://nikonusa.com/Learn-And-Explore/Nikon-Camera-Technology/ftlzi41w/1/3D-Color-Matrix-Metering-II.html.

* cited by examiner

*Primary Examiner* — Rochelle-Ann J Blackman
(74) *Attorney, Agent, or Firm* — Wong, Cabello, Lutsch, Rutherford & Brucculeri LLP

(57) ABSTRACT

Systems, methods, and a computer readable medium for an improved automatic exposure algorithm attempt to classify an image into a particular "scene category," and, based on the determined scene category, meter the scene according to a generated metering weighting matrix. In one embodiment, the average luminance is calculated for a central exposure metering region of the image and a plurality of peripheral exposure metering regions surrounding the central exposure metering region. Based on comparisons of the average luminance values of the peripheral exposure regions to the average luminance of the central exposure region, a target metering weighting matrix may be generated. In another embodiment, the scene category corresponds to a predetermined metering weighting matrix. In video applications, it may be desirable to reduce oscillations in metering parameter values to limit any visually jarring effects on the camera's preview screen by only adjusting metering parameter values when predetermined criteria are met.

24 Claims, 17 Drawing Sheets

SCENE ADAPTIVE AUTO EXPOSURE

BACKGROUND

Today, many personal electronic devices come equipped with digital cameras. Often, these devices perform many functions, and, as a consequence, the digital image sensors included in these devices must often be smaller than sensors in conventional cameras. Further, the camera hardware in these devices often have smaller dynamic ranges and lack sophisticated features sometimes found in larger, professional-style conventional cameras such as manual exposure controls and manual focus. Thus, it is important that digital cameras in personal electronic devices be able to produce the most visually appealing images in a wide variety of lighting and scene situations with limited or no interaction from the user, as well as in the most computationally and cost effective manner possible.

One feature that has been implemented in some digital cameras to compensate for lack of dynamic range and create visually appealing images is known as "auto exposure." Auto exposure (AE) can be defined generally as any algorithm that automatically calculates and/or manipulates certain camera exposure parameters, e.g., exposure time, gain, or f-number, in such a way that the currently exposed scene is captured in a desirable manner. For example, there may be a predetermined optimum brightness value for a given scene that the camera will try to achieve by adjusting the camera's exposure value. Exposure value (EV) can be defined generally as: $\log_2 N^2/t$, wherein N is the relative aperture (f-number), and t is the exposure time (i.e., "shutter speed") expressed in seconds. Some auto exposure algorithms calculate and/or manipulate the exposure parameters such that a mean, center-weighted mean, median, or more complicated weighted value (as in matrix-metering) of the image's brightness will equal a predetermined optimum brightness value in the resultant, auto exposed scene.

Auto exposure algorithms are often employed in conjunction with image sensors having small dynamic ranges because the dynamic range of light in a given scene, i.e., from absolute darkness to bright sunlight, is much larger than the range of light that image sensors—such as those often found in personal electronic devices—are capable of capturing. In much the same way that the human brain can drive the diameter of the eye's pupil to let in a desired amount of light, an auto exposure algorithm can drive the exposure parameters of a camera so as to effectively capture the desired portions of a scene. The difficulties associated with image sensors having small dynamic ranges are further exacerbated by the fact that most image sensors in personal electronic devices are comparatively smaller than those in larger cameras, resulting in a smaller number of photons that can hit any single photosensor of the image sensor.

Auto exposure algorithms work to drive exposure parameters, thus, it is problematic when such auto exposure algorithms base their determinations on how to manipulate exposure settings solely on image parameters, e.g., scene luminance values, that are controlled by—or at least heavily influenced by—the sensor's current exposure settings. For example, in an outdoor scene that is brightly lit by the sun, the camera's auto exposure algorithm will act to shorten exposure time to the smallest possible value. However, if a human subject were to come into the center of the brightly-lit outdoor scene, the overall luminance levels of the scene would likely still be large enough that exposure times would remain at the smallest values, leaving the human subject's face in the center of the scene dark and underexposed.

Thus, there is need for systems, methods, and a computer readable medium for intelligently and dynamically setting a camera's exposure parameters in a visually pleasing way that is independent of the camera's current exposure settings and aware of—and capable of adapting to—the type of scene currently being exposed.

SUMMARY

A more effective scene adaptive auto exposure algorithm as disclosed herein would compare brightness, i.e., luminance, values in first desired regions of the image to luminance values in second desired regions of the same image, thus remaining independent of the camera's current exposure settings. In one embodiment, the average luminance is calculated for a central exposure metering region, e.g., a rectangular region centered over the scene, of the image and a pattern of eight peripheral exposure metering regions surrounding the central exposure metering region. Each peripheral exposure metering region can then be assigned a binary value of '1' if its average luminance is lighter than the central region or a binary value of '0' if its average luminance is darker than the central region. The 8-bit value corresponding to the binary values of the eight peripheral regions can then be used in sequence as a "scene identifier."

Further, an intelligent auto exposure algorithm as disclosed herein could attempt to categorize the type of scene currently being exposed based on a library of predetermined associations of scene identifiers to "scene categories." In one embodiment, one or more scene identifiers could correspond to a single scene category, e.g., outdoor scene (sunny), outdoor scene (snow at bottom), indoor scene, human subject center, etc. Then, based on the determined scene categorization, the scene could be metered more effectively, e.g., according to one or more predetermined metering weighting matrixes having "target weights" corresponding to the different regions of the scene.

In another embodiment, the metering weighting matrix to be used on the scene may be determined "algorithmically." For example, a target weight may be calculated for each of the peripheral regions of the pattern based on whether the average luminance of the peripheral region is darker, lighter or in the same luminance range as the central region. A target weight may also then be calculated for each of the central regions and adjusted based on the luminance values of the peripheral regions. There may also be different target weights for regions that are not a part of the peripheral regions or the central region. In such an algorithmic embodiment, the target weight value of any region may be further refined based on the extent to which the region's luminance is darker or lighter than the central region.

By summing the products of each region's average luminance and the region's target weight value, and then dividing that summed value by the sum of the target weights of all the regions within a given scene's metering weighting matrix, a weighted average, referred to herein as an "AE Average," may be generated for the scene that may be compared to a predetermined metering target value (the "AE Target"), e.g., an 18% gray value. Based on whether the current "AE Average" is less than, greater than, or equal to the predetermined AE Target, the scene adaptive auto exposure method described herein can adjust camera exposure parameters accordingly to attempt to bring the scene's AE Average in line with the predetermined AE Target. For example, the auto exposure method could shorten or lengthen the image sensor's exposure time in an attempt to bring the AE Average in line with the predetermined AE Target value.

In further embodiments, the default metering weighting matrix starting target weight for any of the regions within the image can be further adjusted based on the light-product of the current scene, where light-product can be defined as:

$$\text{LIGHT\_PRODUCT} = \left( \frac{(\text{EXPOSURE\_TIME})(ISO)}{(\text{LENS\_APERTURE})^2} \right). \quad \text{(Eqn. 1)}$$

This allows the scene adaptive AE algorithm to, e.g., reduce the default starting weight for lighter-than-center peripheral regions in indoor backlit scenes to be lower than the default starting target weight for lighter-than-center peripheral regions in outdoor backlit scenes.

In video applications, it may be desirable to reduce oscillations in metering parameter values to limit any visually jarring effects on the camera's preview screen caused by rapidly changing exposure parameters. In one embodiment, the exposure-independent, scene adaptive dynamic auto exposure method described herein may limit oscillations in metering parameter values by, e.g., only adjusting metering parameter values when: 1.) multiple of the peripheral exposure metering regions' binary values have changed; 2.) the image's overall luminance is beyond an acceptable threshold from an acceptable mean value, e.g., 18% gray; or 3.) the image's scene category has changed for a predetermined amount of time.

Because of efficiencies gained by the embodiments disclosed herein, the exposure-independent, scene adaptive, dynamic auto exposure method described below may be implemented directly in a personal electronic device's hardware and/or software, making the method readily applicable to any number of personal electronic devices possessing digital cameras, such as digital video cameras, mobile phones, personal data assistants (PDAs), portable music players, or laptop/desktop/tablet computers. Alternatively, the exposure-independent, scene adaptive dynamic auto exposure method described below may be implemented in conventional cameras.

DETAILED DESCRIPTION

This disclosure pertains to systems, methods, and a computer readable for dynamically setting a camera's exposure parameters in a way that is exposure-independent and scene adaptive. While this disclosure discusses a new technique for exposure-independent and scene adaptive dynamic auto exposure, one of ordinary skill in the art would recognize that the techniques disclosed may also be applied to other contexts and applications as well. The techniques disclosed herein are applicable to any number of electronic devices with digital image sensors, such as digital cameras, digital video cameras, mobile phones, personal data assistants (PDAs), portable music players, computers, and conventional cameras. An embedded processor, such a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for those of ordinary skill having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
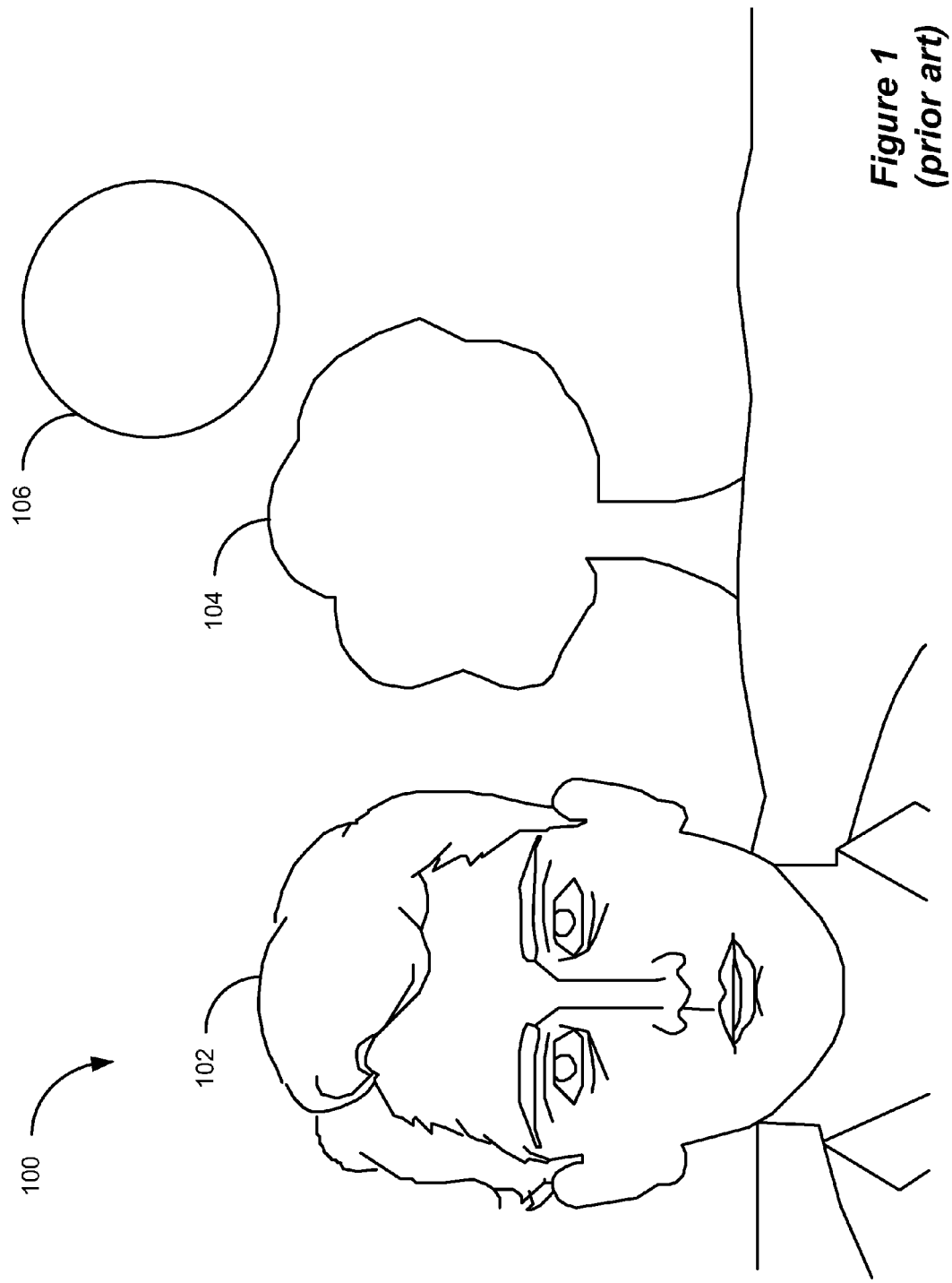
FIG. 1 illustrates a typical outdoor scene with a human subject, in accordance with one embodiment.

Referring now to FIG. 1, a typical outdoor scene 100 with a human subject 102 is shown, in accordance with one embodiment. The scene 100 also includes the Sun 106 and a natural object, tree 104. Regions around the face of human subject 102 will likely have much lower luminance values than regions around objects such as the Sun 106. This is important because, especially in the case of outdoor scenes, such as that shown in FIG. 1, the Sun 106 (or any number of other possible back lighting sources) can have a large—and often detrimental—effect on the way a camera using a standard exposure algorithm meters the scene. Because of the very large brightness values that will be measured in pixels in the upper half of the scene due to the Sun, cameras using a standard exposure algorithm will tend to meter and expose the scene in such a manner that the person's face will be quite dark and the background will be more fully exposed.

Figure 2:
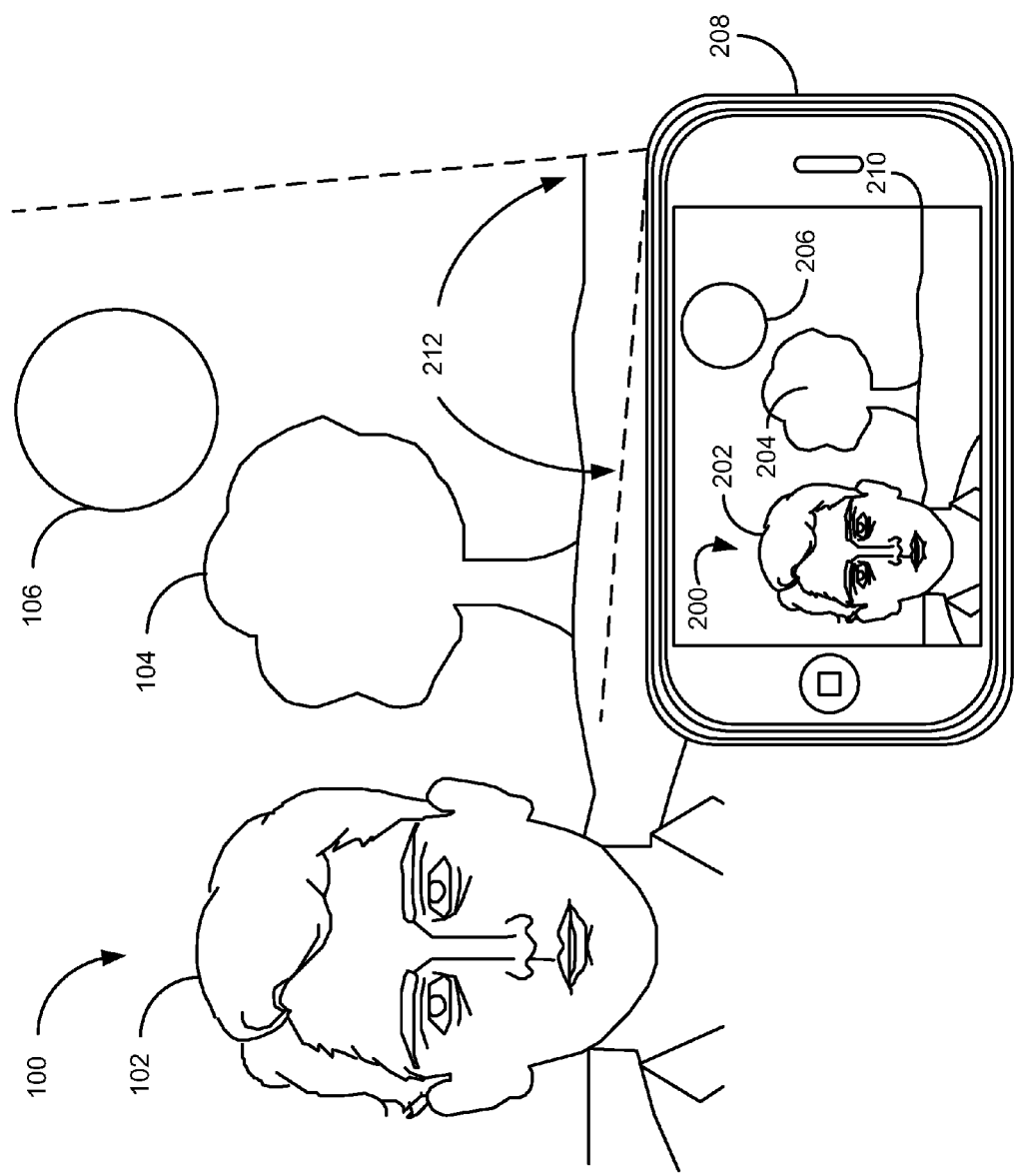
FIG. 2 illustrates a typical outdoor scene with a human subject as viewed on a camera's preview screen, in accordance with one embodiment.

Referring now to FIG. 2, a typical outdoor scene 200 with a human subject 202 as viewed on a camera device 208's preview screen 210 is shown, in accordance with one embodiment. The dashed lines 212 indicate the viewing angle of the camera lens (not shown) on the reverse side of camera device 208. As mentioned previously, although camera device 208 is shown here as a mobile phone, the teachings presented herein are equally applicable to any electronic device possessing a camera, such as, but not limited to: digital video cameras, personal data assistants (PDAs), portable music players, laptop/desktop/tablet computers, or conventional cameras. Each object in the scene 100 has a corresponding representation in the scene 200 as viewed on a camera device 208's preview screen 210. For example, human subject 102 is represented as object 202, tree 104 is represented as object 204, and Sun 106 is represented as object 206.

Figure 3:
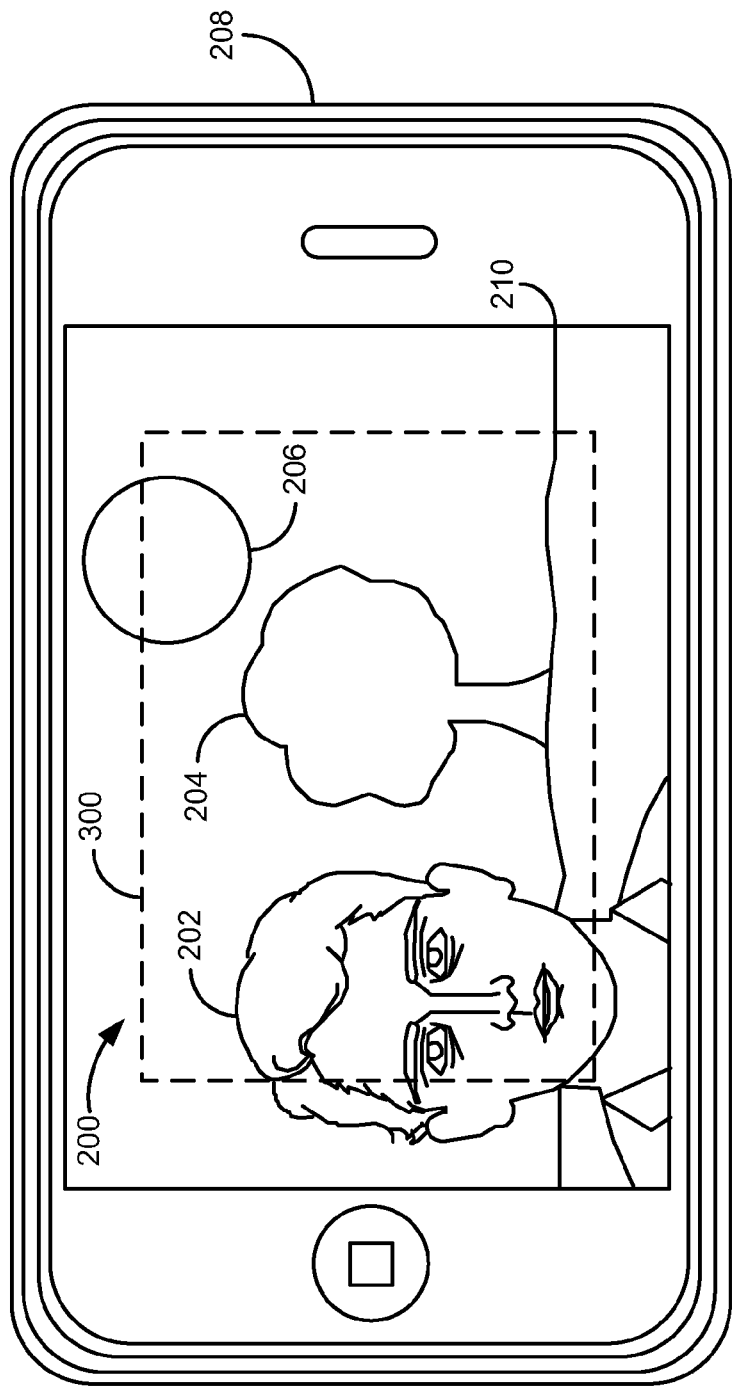
FIG. 3 illustrates a typical exposure metering region for an outdoor scene with a human subject, in accordance with one embodiment.

Referring now to FIG. 3, a typical exposure metering region, exposure metering rectangle 300, for an outdoor scene 200 without a human subject is shown, in accordance with one embodiment. In this exemplary embodiment, the exposure metering rectangle 300 has dimensions that are 75% of the corresponding dimensions of camera device 208's preview screen 210. That is, exposure metering rectangle 300's width is 75% of the width of camera device 208's preview screen 210 and exposure metering rectangle 300's height is 75% of the height of camera device 208's preview screen 210. The 75% dimension choice is not strictly necessary, but it has been empirically determined that choosing an exposure metering rectangle 300 of this size can help exposure determinations from being overly influenced by light sources located at the periphery of the frame, e.g., the Sun or overhead lights at the top of an image. In auto exposure algorithms according to some embodiments, an exposure metering region, such as exposure metering rectangle 300, is inset over the frame, and the camera's exposure parameters are driven such that the average brightness of the pixels within exposure metering rectangle 300 are equal or nearly equal to an 18% gray value. For example, with 8-bit luminance (i.e., brightness) values, the maximum luminance value is $2^8-1$, or 255, and, thus, an 18% gray value would be 255*0.18, or approximately 46. If the average luminance of the scene is brighter than the optimum 18% gray value by more than a threshold value, the camera could, e.g., decrease the exposure time, t, whereas, if the scene were darker than the optimum 18% gray value by more than a threshold value, the camera could, e.g., increase the exposure time, t. A simple, rectangle-based auto exposure algorithm, such as that explained above with regard to FIG. 3 may work satisfactorily for some scene categories, but may lead to undesirable photos in other types of scenes, e.g., if there is a human subject in the foreground of a brightly-lit outdoor scene, as is explained further in regard to FIG. 4.

Figure 4:
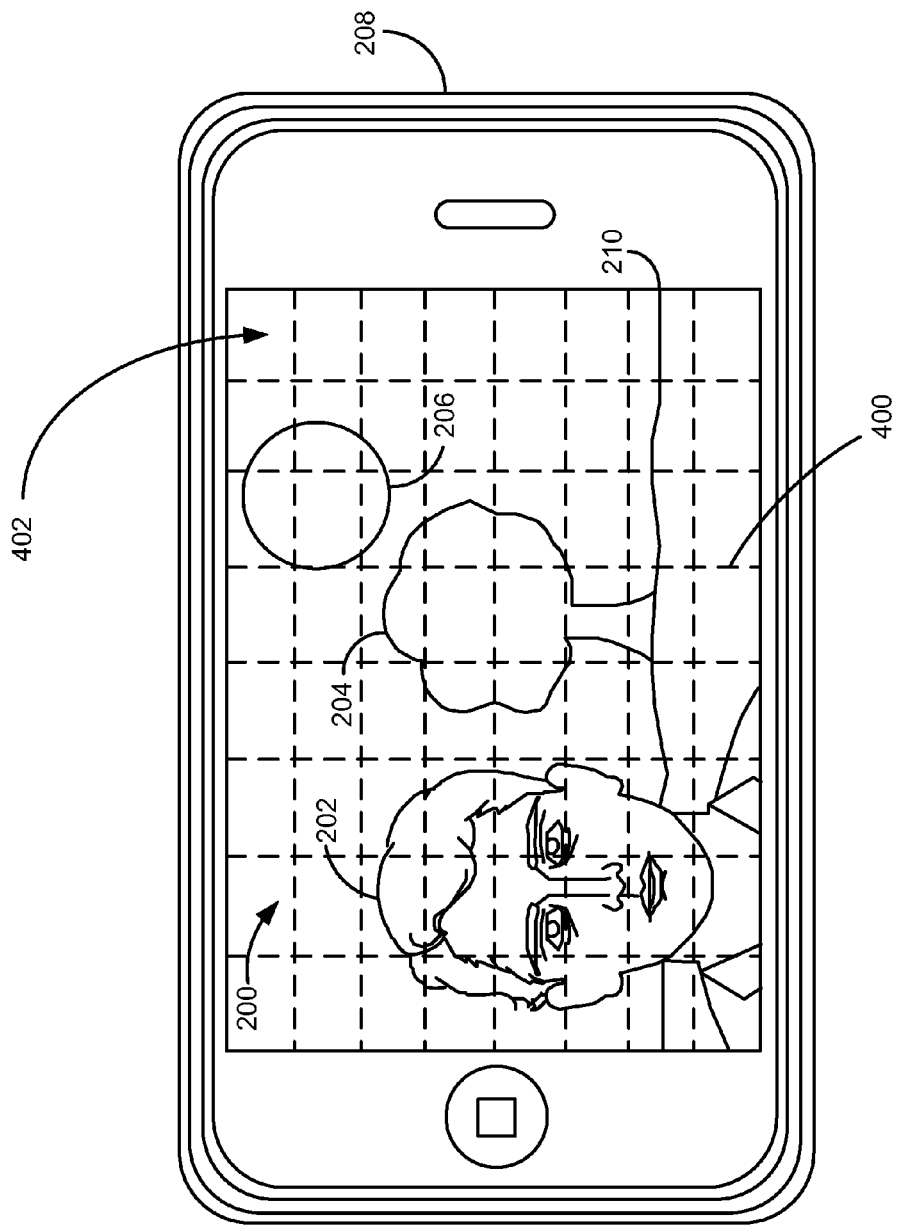
FIG. 4 illustrates a plurality of regions within an outdoor scene with a human subject, in accordance with one embodiment.

Referring now to FIG. 4, a plurality of areas, i.e., regions 402, within an outdoor scene with a human subject are shown, in accordance with one embodiment. In FIG. 4, regions 402 are created by dividing lines 400. In this embodiment, the preview screen 210 on camera device 208 is divided into eight equally-sized rows and eight equally-sized columns to create 64 regions, although this is not strictly necessary. In other embodiments, the number of regions 402 used in the exposure-independent, scene adaptive, dynamic auto exposure method can be determined by the camera device 208's hardware settings. In this embodiment, each of the plurality of regions 402 is equal in size, although this is also not strictly necessary. Differences in the sizes of regions 402 could potentially be compensated for later in the auto exposure process via the use of target weights, as will be explained further below.

Figure 5:
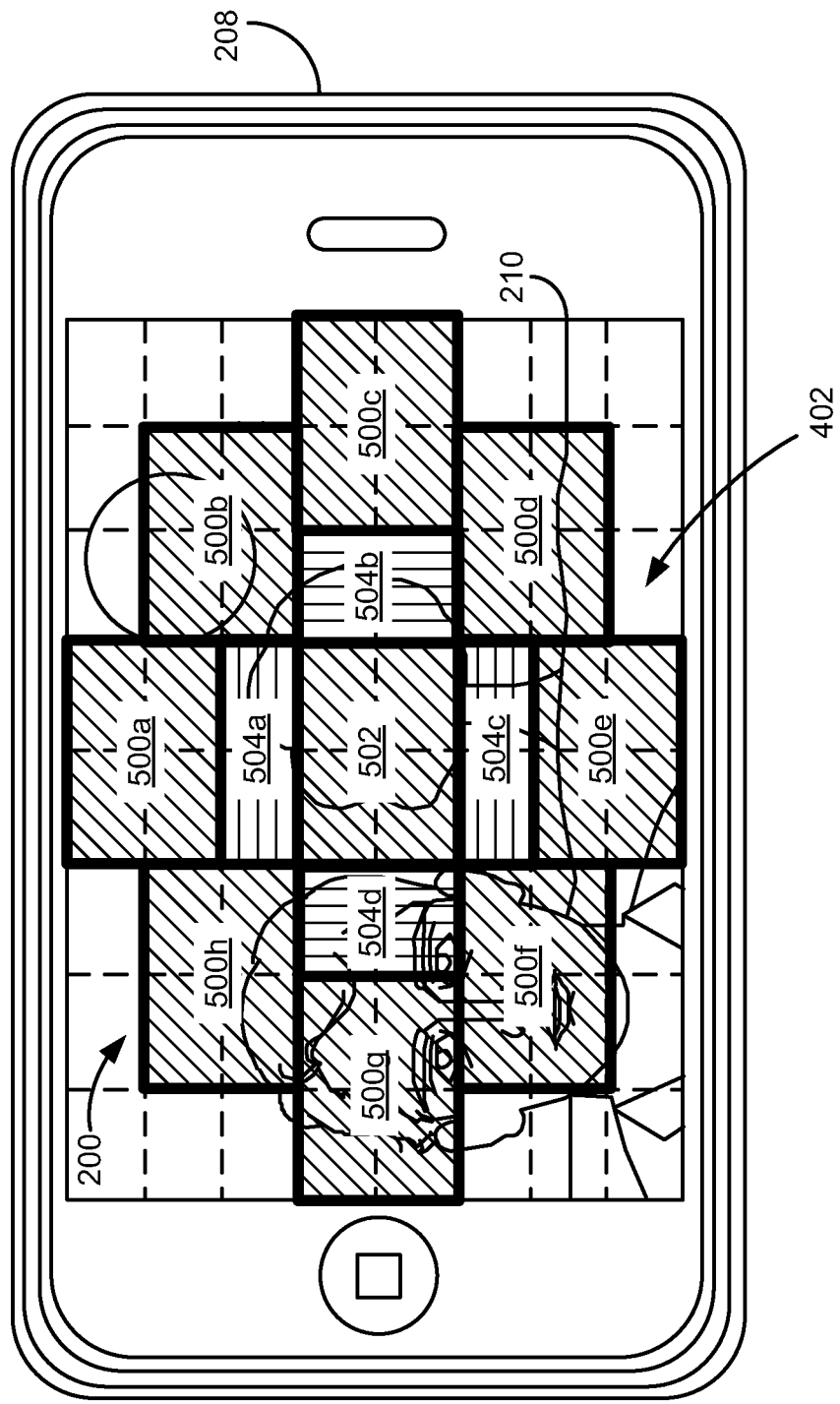
FIG. 5 illustrates a pattern of exposure metering regions, in accordance with one embodiment.

Referring now to FIG. 5, a pattern of peripheral exposure metering regions 500/504 and a central exposure metering region 502 are shown, in accordance with one embodiment. As shown in FIG. 5, the peripheral exposure metering regions 500/504 form a ring around central exposure metering region 502. In some embodiments, the auto exposure method will calculate an average luminance value for each peripheral exposure metering region 500a-h and the central exposure metering region 502. The exposure metering regions 500/502/504 may be as large or as small as is desired to sample the luminance values over a sufficient portion of the currently exposed scene. As shown in FIG. 5, the exposure metering regions 500/502 consist of four regions 402 each, thus the average luminance value for the exposure metering regions 500 would be the average luminance value of all the pixels comprising the four regions 402 that comprise a given exposure metering region 500. Exposure metering regions 504, also known as the inner peripheral exposure metering regions, are shown as consisting of two regions 402 each. In some embodiments, the number of peripheral exposure metering regions 500 analyzed will be equal the number of bits in the scene identifier value. For example, as shown in FIG. 5, there are eight peripheral exposure metering regions 500a-h, thus the scene identifier in such an embodiment would be an eight-bit value. As further shown in FIG. 5, the inner peripheral exposure metering regions 504a-d form a smaller concentric ring of exposure metering regions around central region 502. In some embodiments, the default metering weighting matrix starting target weight for the exposure metering regions 504a-d will be derived from the default metering weighting matrix starting target weight for the central exposure metering region 502. In further embodiments, the default metering weighting matrix starting target weight for regions 402 that are not a part of any exposure metering regions 500/502/504 will be equal to zero.

By subsequently driving the setting of the camera's exposure parameters based at least in part on comparisons between the average luminance values of pixels located within the peripheral exposure metering regions 500a-h and the central exposure metering region 500, the auto exposure decisions remain independent of the camera's current exposure settings. For example, an exposure-independent, scene aware dynamic auto exposure algorithm in accordance with one embodiment may attempt to drive the camera's exposure parameters based on the outcome of individual comparisons between the average pixel luminance in each of the peripheral exposure metering regions 500 and the average pixel luminance within central exposure metering region 502, as will be explained in further detail below. In some embodiments, this could allow for the scene to be exposed in a way that more favorably exposes human subject 202's face and leads to more visually pleasing images for a variety of different scene compositions.

Figure 6:
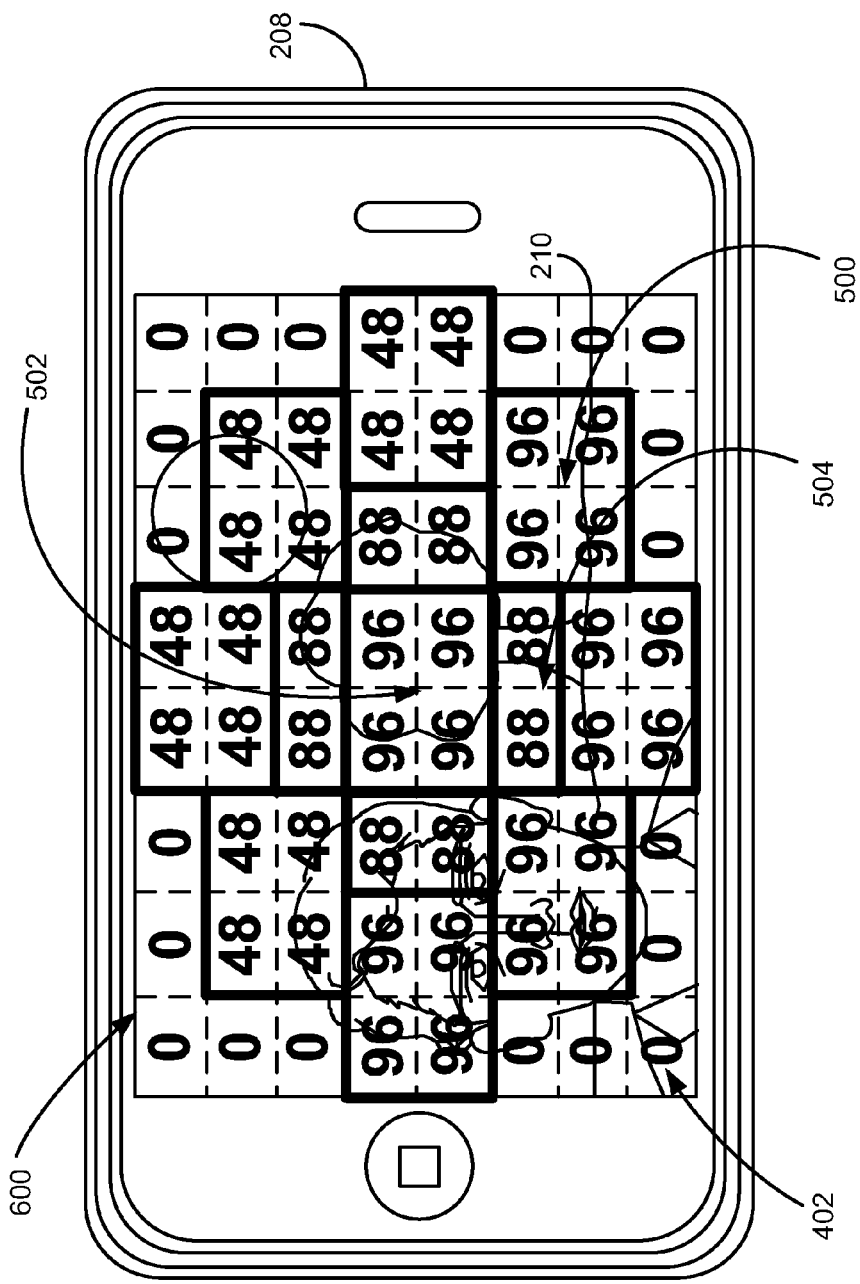
FIG. 6 illustrates a metering weighting matrix for one pattern of exposure metering regions, in accordance with one embodiment.

Referring now to FIG. 6, a hypothetical metering weighting matrix 600 of 8-bit values (shown in the bolded black numbers) corresponding to the pattern of exposure metering regions shown in FIG. 5 is illustrated, in accordance with one embodiment. As shown in FIG. 6, the peripheral exposure metering regions 500 outlined by thick black lines form a concentric ring around central exposure metering region 502. As also shown in FIG. 6, the peripheral exposure metering regions 500 consist of four regions 402 each, thus the average luminance value for a peripheral exposure metering region 500 would be the average luminance value of all the pixels in the regions 402 comprising a given exposure metering region 500. In the hypothetical metering weighting matrix 600 depicted in FIG. 6, regions 402 comprising the central exposure metering region 502 are assigned a default starting metering weighting matrix target weight of '96' (with 8-bit values, the metering weighting matrix target weights range from 0-255). Further, the regions 402 comprising the inner peripheral exposure metering regions 504 are assigned a default starting metering weighting matrix target weight that is 8 less than the weight assigned to regions in the central exposure metering region 502, i.e., '88.' For the regions 402 comprising the peripheral exposure metering regions 500: if the average luminance for the peripheral exposure metering region is lighter than the average luminance of the central exposure metering region 502, regions within the peripheral exposure metering region are assigned a default starting metering weighting matrix target weight of '48'; if the average luminance for the peripheral exposure metering region is darker than the average luminance of the central exposure metering region 502, regions within the peripheral exposure metering region are assigned a default starting metering weighting matrix target weight of '96'; and if the average luminance for the peripheral exposure metering region is in the same luminance range as the average luminance of the central exposure metering region 502 (i.e., within a predetermined threshold value), regions within the peripheral exposure metering region are assigned a default starting metering weighting matrix target weight of '96.' For the regions 402 not comprising any exposure metering region 500/502/504, a default starting metering weighting matrix target weight of '0' is assigned.

In certain embodiments, it may be beneficial use the same default starting metering weighting matrix target weight for regions that are darker than the average luminance of the central exposure metering region as is used for regions that are in the same luminance range as the average luminance of the central exposure region, however, in other embodiments, it may be beneficial to use a slightly higher default starting metering weighting matrix target weight for regions that are darker than the average luminance of the central exposure metering region. Such default starting metering weighting matrix target weight values should be determined empirically, and may be effected by the image sensor's characteristics, the camera's exposure characteristics, the types of scenes that are being captured, or any number of other factors.

By summing the products of each region's average luminance and the region's target weight value, and then dividing that summed value by the sum of the target weights of all the regions in the metering weighting matrix, a weighted average value, referred to herein as the "AE Average," may be calculated. This is merely one formula for calculating a weighted average of the scene's luminance values, and other formulas may be empirically determined and applied in order to calculate the "AE Average" in a desired manner. Based on the value of the AE Average for a given scene, the scene adaptive auto exposure method may be able to drive the camera's exposure parameter values in an intelligent and desirable way. The weighting scheme and values described above are merely exemplary and are only one embodiment of a scheme that has been empirically determined to produce satisfactory images for most scene compositions. Further, different weighting schemes may be appropriate for different applications. For example, different weighting schemes may be employed for taking a photo, taking a video, or videoconferencing.

Figure 7:
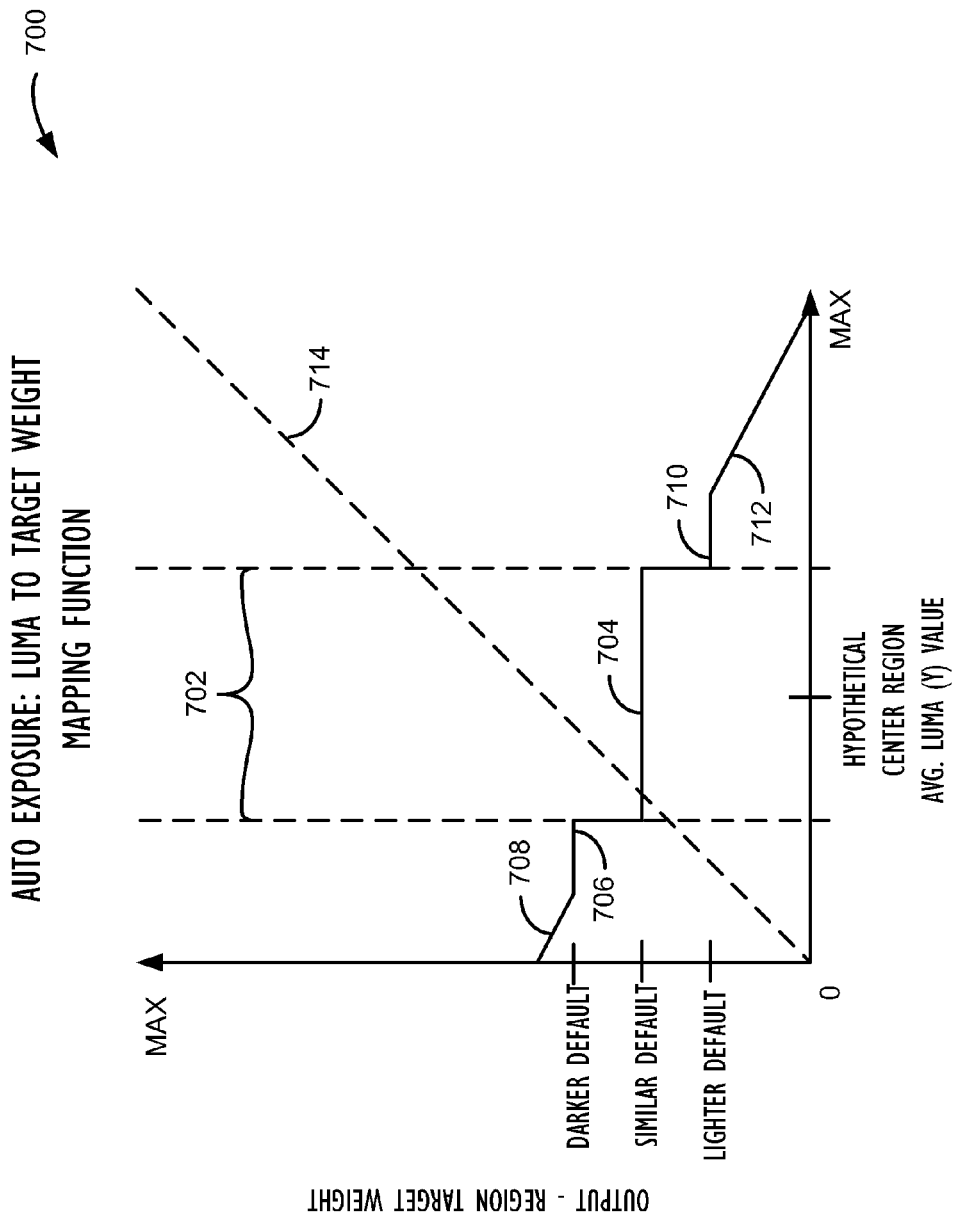
FIG. 7 illustrates a graph depicting a piecewise defined weighting mapping function used to adjust metering weighting matrix values, in accordance with one embodiment.

Referring now to FIG. 7, a graph 700 depicting a piecewise defined weighting mapping function used to adjust metering weighting matrix values is shown, in accordance with one embodiment. The x-axis of graph 700 represents the "input" to the weighting mapping function, i.e., the average luminance value of a region having a weight that is desired to be mapped using the weighting mapping function. The x-axis is also demarcated with a vertical line indicating the average luminance value of a hypothetical central exposure metering region for the scene being exposed. Vertical dashed lines 702 indicate luminance values that are plus and minus some predetermined amount from the value from the hypothetical central exposure metering region's average luminance value. The y-axis of graph 700 represents the "output" of the weighting mapping function, i.e., the target weight which will be assigned to a given region in the output adjusted metering weighting matrix. Dashed line 714 is a line with a slope of one.

As described above with reference to FIG. 6, one embodiment of an improved scene adaptive auto exposure method operates by assigning default starting metering weighting matrix target weights for each region within a scene. For regions comprising peripheral exposure metering regions that are within some range, e.g., 50% plus or minus (as depicted by dashed lines 702), of the average luminance of the central exposure metering region, a "Similar Default" starting metering weighting matrix target weight value is assigned to the region, represented by line segment 704. For regions comprising peripheral exposure metering regions darker than the average luminance of the central exposure metering region, a "Darker Default" starting metering weighting matrix target weight value is assigned to the region, represented by line segment 706. In some embodiments, the "Darker Default" value may be equal to the "Similar Default" value, although this is not strictly necessary. For regions below a certain darkness threshold, the assigned value may then adjusted by being linearly stretched between the "Darker Default" value and a maximum target weight, represented by line segment 708. In some embodiments, the maximum target weight may be significantly less than the maximum possible value, e.g., in an 8-bit embodiment with a maximum possible luminance value of '255,' the maximum target weight may be confined to '128' so as to not overemphasize the darkest areas of the image, possibly leading to overexposure problems. For regions comprising peripheral exposure metering regions lighter than the average luminance of the central exposure metering region, a "Lighter Default" starting metering weighting matrix target weight value is assigned to the region, represented by line segment 710. For regions above a certain brightness threshold, the assigned value may then adjusted by being linearly stretched between the "Lighter Default" value and a minimum target weight, represented by line segment 712. The above described adjustment process can serve to further refine the default starting metering weighting matrix target weights, e.g., those weights shown in bolded black numbers in the regions of the scene illustrated in FIG. 6. This adjustment process can be beneficial, e.g., in regions located near Sun 206, as they are likely to be much brighter than the regions within the central exposure metering region, thus assigning them the "Lighter Default" value may still leave those regions over-emphasized in the calculation of the "AE Average." As shown in FIG. 7, regions with an input average luminance value that is close to the maximum value will be mapped to an output region target weight in the adjusted metering weighting matrix that is very close to zero. The values for "Similar Default," "Darker Default," and "Lighter Default" may also be further adjusted based on the scene's light product information, wherein light product may be calculated according to Eqn. 1 above. For example, it may be desirable to have a lower starting "Lighter Default" value for indoor backlit scenes than for outdoor backlit scenes. Further, different weighting mapping functions may be used for different applications. For example, different weighting mapping functions may be employed for taking a photo, taking a video, or videoconferencing.

In some embodiments, further adjustments are undertaken to the metering weighting matrix target weights of the regions comprising the central exposure metering region. Specifically, the default starting metering weighting matrix target weight assigned to regions 402 comprising the central exposure metering region 502 may be decreased by a predetermined amount for each of the peripheral exposure metering regions 500 that have a darker average luminance value than the central exposure metering region 502. For instance, as shown in FIG. 6, three of the peripheral exposure metering regions (500d-f) have a darker average luminance value than the central exposure metering region 502. Thus, if the predetermined reduction amount for the central exposure metering region 502 was '12,' its adjusted target weight value would be 96−12−12−12='60.' In some embodiments, the target weight values for the inner peripheral exposure metering regions 504 may also be reduced by the same amount as the central exposure metering region 502. Thus, if the default starting metering weighting matrix target weight for the inner peripheral exposure metering regions 504 was '88,' their adjusted values would be 88−12−12−12='52.' In further embodiments, there may be a "floor" on the amount that the metering weighting matrix target weights of the central exposure metering region 502 or the inner peripheral exposure metering regions 504 may be reduced. E.g., in some embodiments, no region would have its target weight reduced by more than '32' from its default starting target weight. Thus, in the example of FIG. 6, the central exposure metering region 502 could be lowered to at most a target weight of '64,' and the inner peripheral exposure metering regions 504 could be lowered to at most a target weight of '56.'

Figure 8:
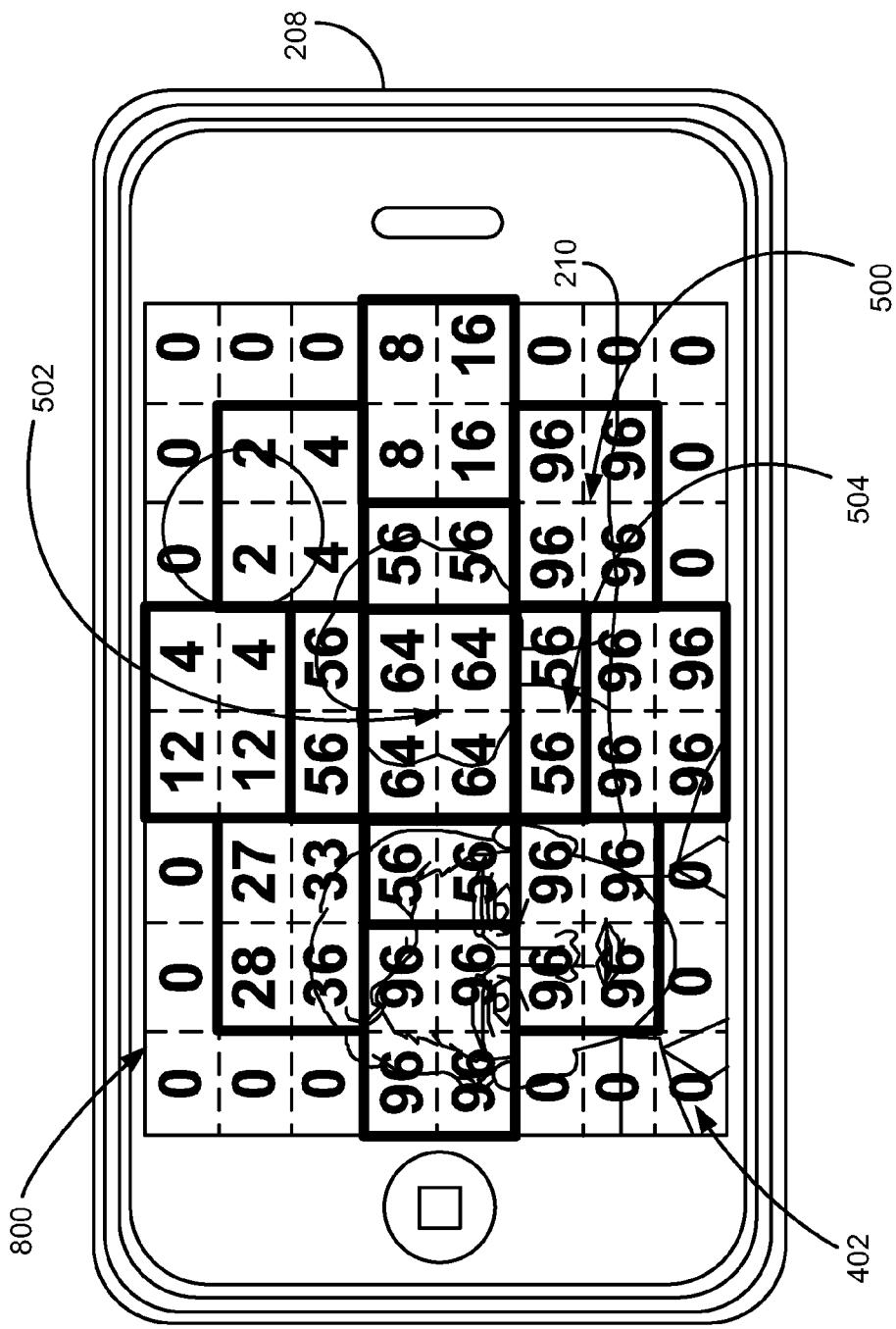
FIG. 8 illustrates an adjusted metering weighting matrix for one pattern of exposure metering regions, in accordance with one embodiment.

Referring now to FIG. 8, an adjusted metering weighting matrix 800 for a hypothetical metering weighting matrix 600 of FIG. 6 is illustrated, in accordance with one embodiment. The adjusted metering weighting matrix target weights for each of the regions 402 in adjusted metering weighting matrix 800 has been transformed according to a weighting mapping function such as that depicted and described in relation to FIG. 7 above. As can be seen in FIG. 8, both the central exposure metering region 502 and the inner peripheral exposure metering regions 504 have been reduced by the maximum allowable amount due to the three darker peripheral exposure metering regions 500d-f. Further, the regions 402 near the Sun 206 have been reduced almost to zero by the weighting mapping function due to their extremely high average luminance values. Because, in some embodiments, the AE Average is used to drive exposure parameters, a scene using the unadjusted metering weighting matrix 600 would likely be metered differently (e.g., with a shorter exposure time) than a scene using the adjusted metering weighting matrix 800.

Figure 9:
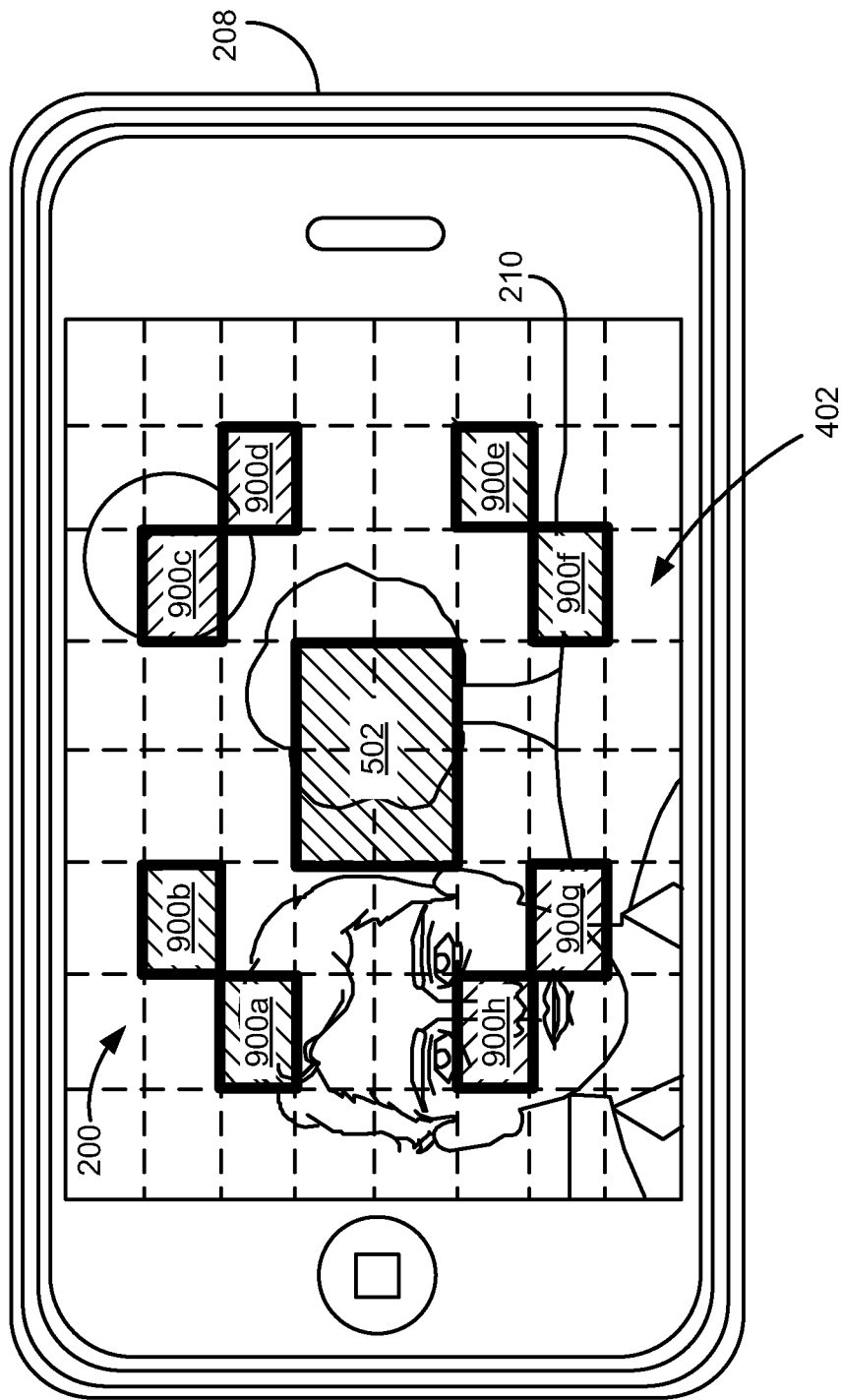
FIG. 9 illustrates another pattern of exposure metering regions, in accordance with one embodiment.

Referring now to FIG. 9, another pattern of exposure metering regions is shown, in accordance with one embodiment. In FIG. 9, the peripheral exposure metering regions 900a-h consist of only one region 402 each. The locations of the exposure metering regions 900a-h shown in FIG. 9 are merely exemplary and are only one embodiment of a scheme that has been empirically determined to produce satisfactory images for most scene compositions. According to one embodiment, the average luminance is calculated for central exposure metering region 502 and the pattern of eight peripheral exposure metering regions 900a-h surrounding the central region 502. Each peripheral region 900 can then be given a binary value of '1' if its average luminance is lighter than the central region or a binary value of '0' if its average luminance is darker than the central region. The concatenated 8-bit value corresponding to the binary values of the eight peripheral regions in sequence can then be used as a "scene identifier." Such an embodiment could then attempt to categorize the type of scene currently being exposed based on a library of predetermined associations of scene identifiers to "scene categories." In one embodiment, one or more scene identifiers could correspond to a single scene category, e.g., outdoor scene (sunny), outdoor scene (snow at bottom), indoor scene, human subject center, etc. Then, based on the determined scene categorization, the scene could be metered more effectively, e.g., according to one or more predetermined metering weighting matrixes, as will be described further in relation to FIG. 12. This predetermined scene category metering weighting matrix embodiment could be use instead of, or in conjunction with, the "algorithmic" method described above with reference to FIGS. 5-8. Likewise, the average luminance values of the regions comprising the pattern of exposure metering regions 500a-h shown in FIG. 5 could be used instead of the average luminance values of the regions comprising the pattern of exposure metering regions 900a-h shown in FIG. 9 to calculate the scene identifier according to the methods described below in relation to FIGS. 10 and 11.

Figure 10:
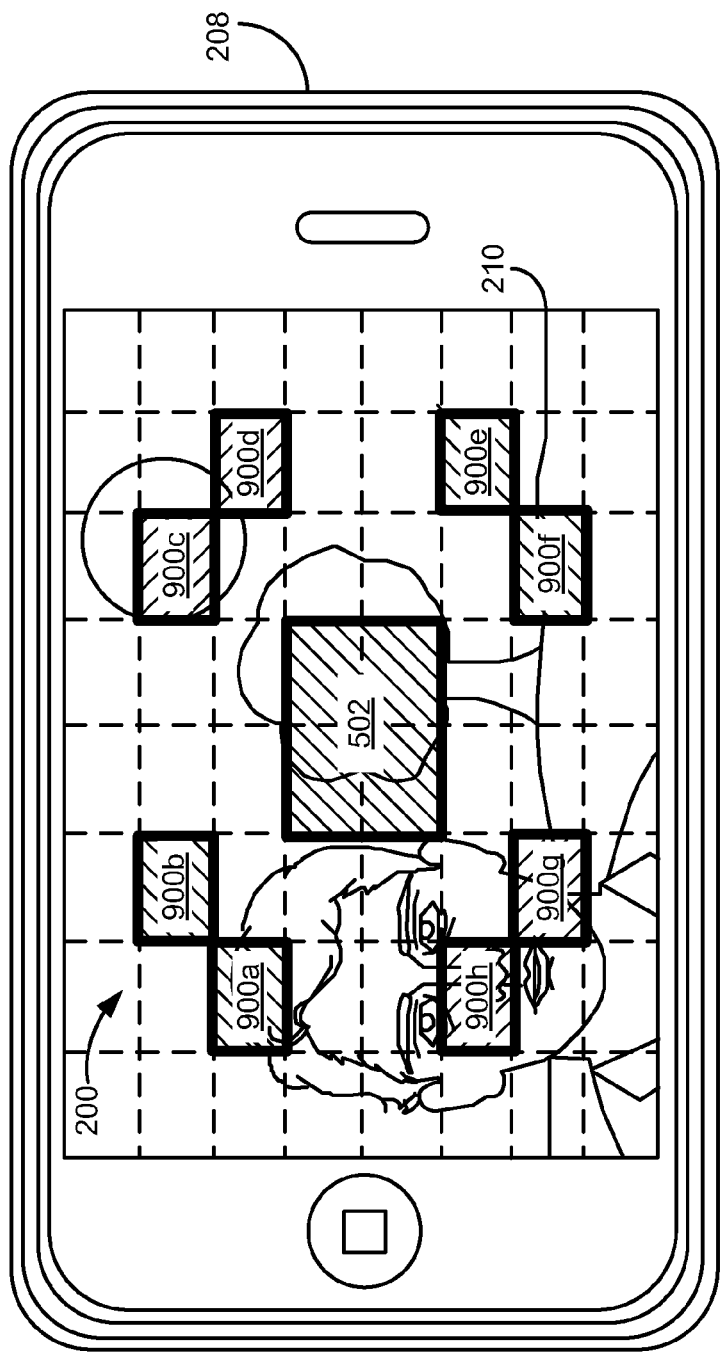
FIG. 10 illustrates a comparison table of peripheral exposure metering regions to a central exposure metering region for a landscape-oriented scene, in accordance with one embodiment.

Referring now to FIG. 10, a comparison table 1000 depicting the output of comparisons of peripheral exposure metering regions 900a-h to a central exposure metering region 502 for a "landscape-style" scene 200 is shown, in accordance with one embodiment. As shown in FIG. 9, the exposure metering regions 900 are labeled in a clockwise fashion from 900a to 900h. Note that the exposure metering regions 900a-d are located across the top half of the preview screen. For outdoor scenes, the exposure metering regions 900a-d are likely to be somewhat brighter than the other exposure metering regions numbered 900e-h and the central exposure metering region 502. Comparison table 1000 represents the output of comparisons between the peripheral exposure metering regions and the central exposure metering region. As shown in comparison table 1000, exposure metering regions 900a-d have average luminance values lighter than the central exposure metering region 502, and exposure metering regions 900e-h have average luminance values darker than the central exposure metering region 502. In this embodiment, exposure metering regions having average luminance values lighter than the central exposure metering region are assigned a binary value of '1,' and exposure metering regions having average luminance values darker than the central exposure metering region are assigned a binary value of '0.' The consecutive string of binary values for exposure metering regions 900a-h comprise a scene identifier. As shown in FIG. 10, the scene identifier for scene 200 is: '11110000.'

Figure 11:
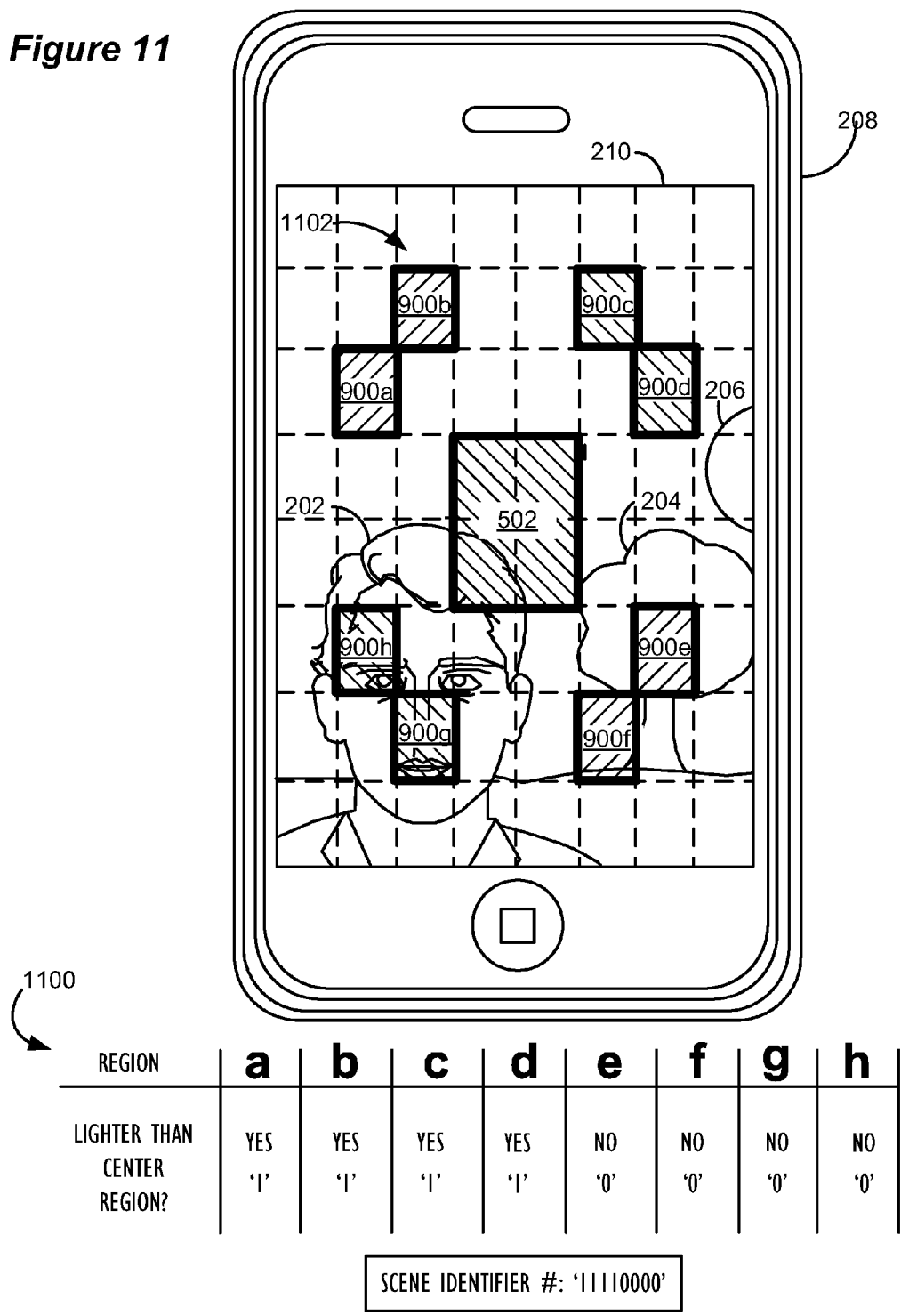
FIG. 11 illustrates a comparison table of peripheral exposure metering regions to a central exposure metering region for a portrait-oriented scene, in accordance with one embodiment.

Referring now to FIG. 11, a comparison table 1100 depicting the output of comparisons of peripheral exposure metering regions 900a-h to a central exposure metering region 502 for a "portrait-style" scene 1102 is shown, in accordance with one embodiment. Essentially, scene 1102 represents scene 200 as depicted in FIGS. 2-6 and 8-10 after being rotated clockwise 90 degrees into a portrait-style orientation. As in FIG. 10, the exposure metering regions 900 in FIG. 11 are labeled in a clockwise fashion from 900a to 900h. By accessing an accelerometer or other device within camera device 208 that reports the camera's orientation, the location and numbering of exposure metering regions 900a-h can remain consistent across camera orientations. Note that the exposure metering regions 900a-d in FIG. 11 are located across the top half of the preview screen, just as they are in FIG. 10. Essentially, the ring of numbered exposure metering regions 900a-h has simply been rotated by the same 90 degrees that camera device 208 has been rotated by. This leads to the favorable result that, in both FIG. 10 and FIG. 11, which represent essentially the same physical scene, the exposure metering regions 900a-d are likely to be somewhat brighter than the other exposure metering regions numbered 900e-h and the central exposure metering region 502. Thus, comparison table 1100 reflects an identical scene identifier, '11110000,' to that shown in FIG. 10, which is beneficial because it will lead scenes 200 and 1102 to be interpreted by the scene adaptive auto exposure method as being in the same "scene category," and thus the two scenes will be metered in a similar way, regardless of camera orientation. Another benefit of such an "orientation-independent" exposure metering region numbering scheme is that it obviates the need to maintain and store a separate "scene-identifier-to-scene-category" lookup database for each possible camera orientation, as will be explained further below.

Figure 12:
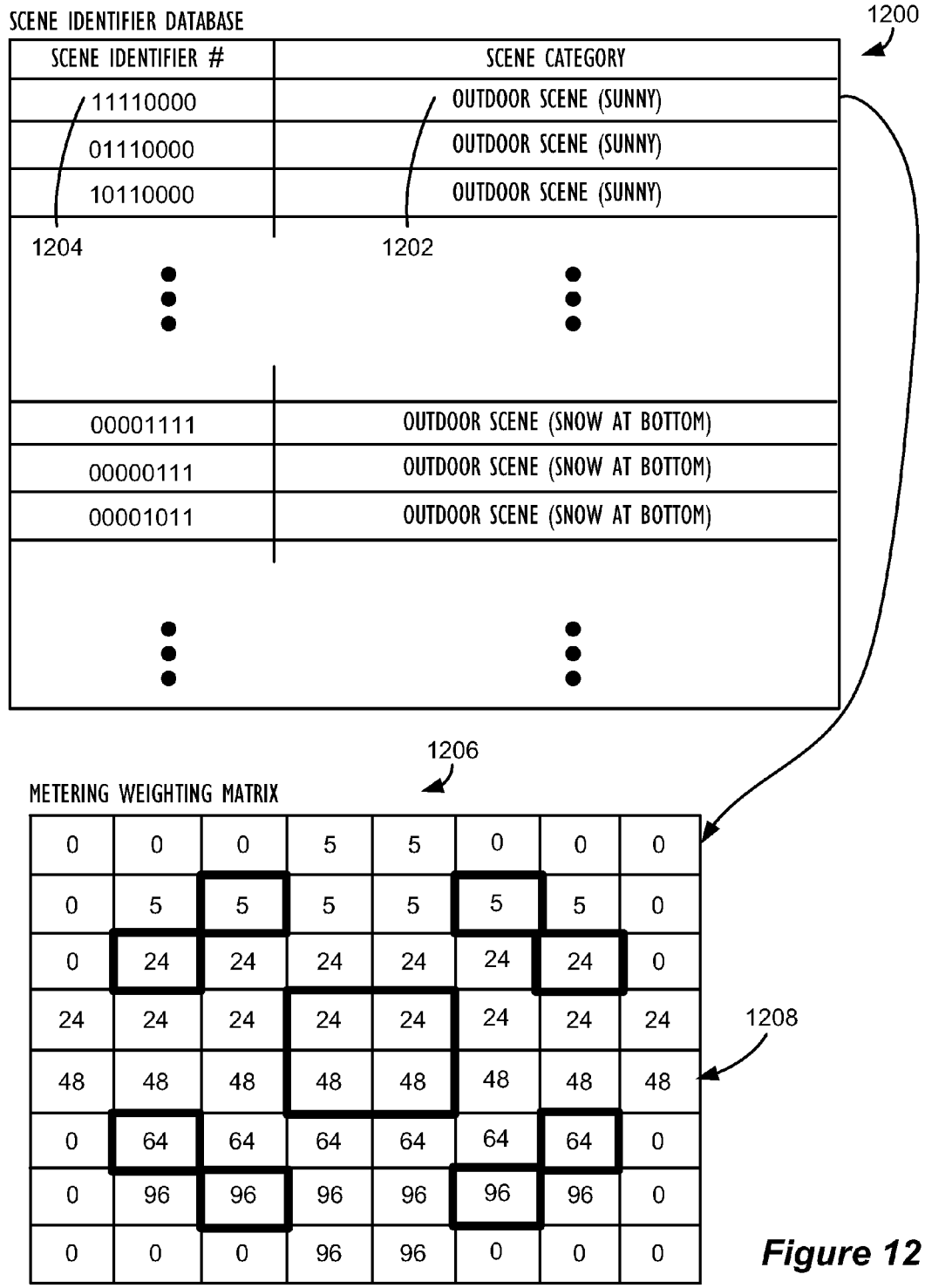
FIG. 12 illustrates a scene identifier database and a metering weighting matrix, in accordance with one embodiment.

Referring now to FIG. 12, a scene identifier database 1200 and a metering weighting matrix 1206 are shown, in accordance with one embodiment. As discussed previously in reference to FIGS. 10 and 11, an improved exposure-independent, scene adaptive dynamic auto exposure method described herein may be able to generate an n-bit scene identifier for each scene currently being exposed. As shown in scene identifier database 1200, each potential 8-bit scene identifier corresponds to a scene category. There may be anywhere from 1 to $2^n$ potential scene categories depending on the level of detail needed for a given implementation. As shown in FIG. 12, scene identifier '11110000' 1204 corresponds to a scene category 1202 called "OUTDOOR SCENE (SUNNY)." This comports with the expectation that brighter average luminance values in exposure metering regions 900a-d, which represent the top half of the scene being metered, correspond to a brightly lit outdoor scene. As is also shown in FIG. 12, several other scene identifiers, '01110000' and '10110000' may also correspond to the "OUTDOOR SCENE (SUNNY)" scene category. In this embodiment, metering weighting matrix 1206 corresponds to the "OUTDOOR SCENE (SUNNY)" scene category. Metering weighting matrix 1206 is divided into the same number of areas, i.e., regions 1208, as the scene being metered, in this instance, scene 200. Each region 1208 in the metering weighting matrix 1206 has a predetermined target weight that has been empirically determined for the given scene category. For instance, the region labeled 1208 has a target weight of '48.' This means that, in calculating an AE Average for the scene to drive exposure parameters, region 1208 could contribute a weight of '48' multiplied by the average luminance value for the region. By averaging the target weight values multiplied by the average luminance value for each region in the scene, and then dividing by the sum of all the target weight values for the scene, an AE Average for the scene may be calculated. Based on the calculated AE Average, the camera's exposure parameters may be set in such a way as to produce visually appealing images. As can be seen in metering weighting matrix 1206, the relative weights given to the regions within the image decrease towards the top of the scene. This is appropriate in a brightly lit outdoor scene because allowing regions near the top of the scene to dominate the calculation would likely lead to a very short exposure time, thus underexposing whatever objects are in the foreground of the scene. The other scene categories 1202 could also have corresponding metering weighting matrixes that have been empirically determined to result in proper exposure. For example, the scene category of "OUTDOOR SCENE (SNOW AT BOTTOM)" may have a metering weighting matrix that looks like an upside down version of metering weighting matrix 1206, i.e., higher target weights for regions at the top of the scene and lower target weights for regions at the bottom of the scene. Notice that the values in metering weighting matrix 1206 may also need to be rotated to correspond to the current orientation of camera device 208. Further, the values in metering weighting matrix 1206 may also be adjusted based on the scene's light product information, wherein light product may be calculated according to Eqn. 1 above. For example, it may be desirable to have a lower target weight values for indoor backlit scenes than for outdoor backlit scenes.

Figure 13:
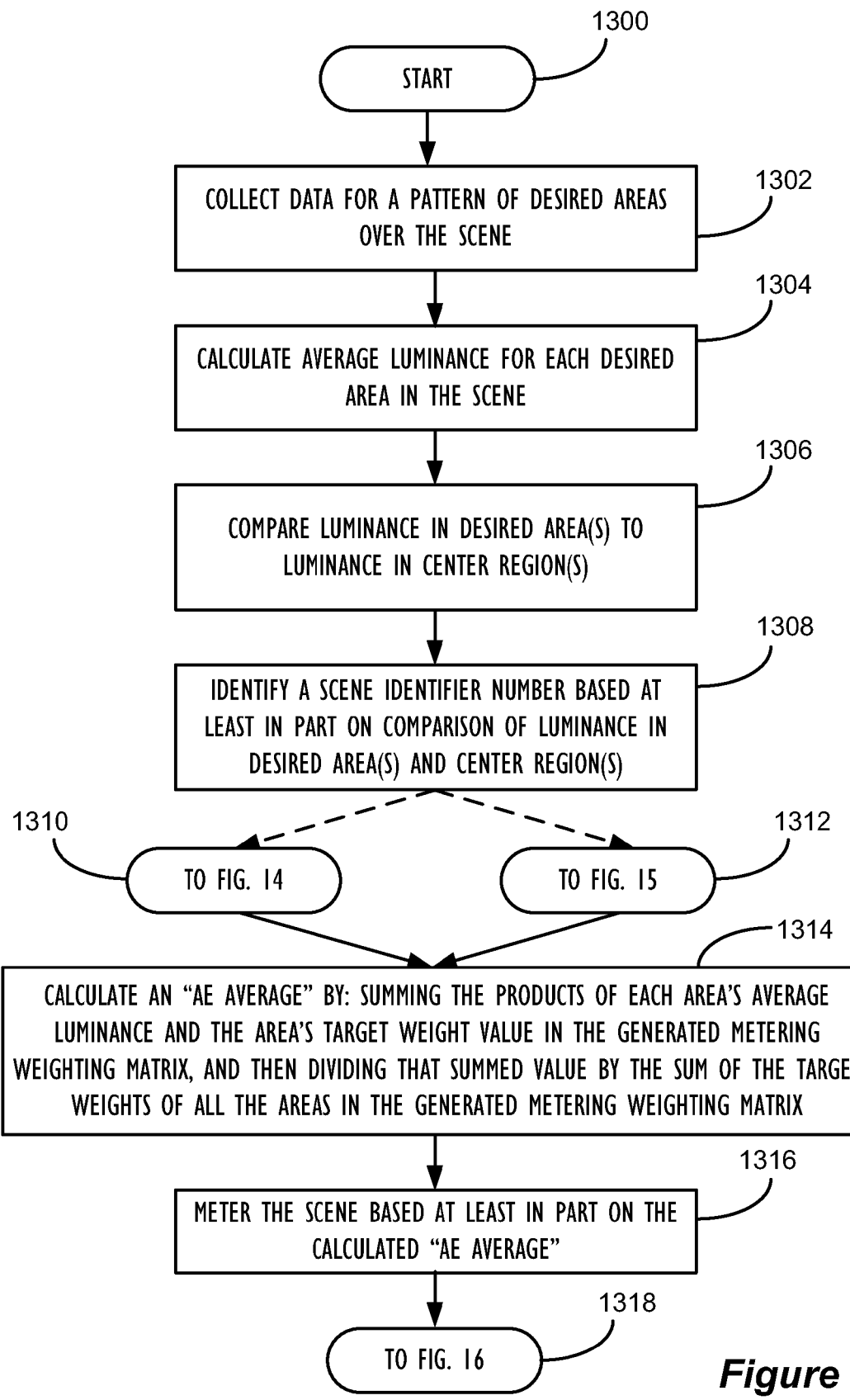
FIG. 13 illustrates, in flowchart form, one embodiment of a process for exposure-independent, scene adaptive, dynamic auto exposure, in accordance with one embodiment.

FIG. 13 illustrates, in flowchart form, one embodiment of a process for exposure-independent, scene adaptive, dynamic auto exposure, in accordance with one embodiment. First, the process for exposure-independent, scene adaptive, dynamic auto exposure begins at Step 1300. Next, the process collects data for a pattern of desired areas over the scene (Step 1302). Such a pattern may be like that depicted in FIG. 5 or FIG. 9 or any number of other suitable patterns. Next, the process may calculate the average luminance for each desired area in the scene (Step 1304). Next, the process may carry out a sequence of comparisons of the average luminance values of the desired areas to the average luminance of a center region(s) (Step 1306). Alternatively, some other parameter beyond average luminance may be used in the comparison, e.g., a single-channel color brightness value. Next, the process will identify a scene identifier number based at least in part on the comparisons between the desired areas and the center region(s) (Step 1308). At this point, the process may either use an algorithmic scene adaptive auto exposure method by proceeding to the process illustrated in FIG. 14 (Step 1310) or use a predetermined scene category metering weighting matrix by proceeding to the process illustrated in FIG. 15 (Step 1312). Upon returning from either the process illustrated in FIG. 14 or the process illustrated in FIG. 15, the process illustrated in FIG. 13 may then calculate a weighted average value, e.g., an "AE Average," by summing the products of each region's average luminance and the region's target weight value in the generated metering weighting matrix, and then dividing that summed value by the sum of the target weights of all the regions in the generated metering weighting matrix (Step 1314). Then, the process may proceed to meter the scene based at least in part on the calculated AE Average (Step 1316). Once the process has begun to carry out scene adaptive auto exposure, the method may proceed to process illustrated in FIG. 16 (Step 1318) to attempt to prevent video oscillations from the rapid adjustment of exposure parameter values.

Figure 14:
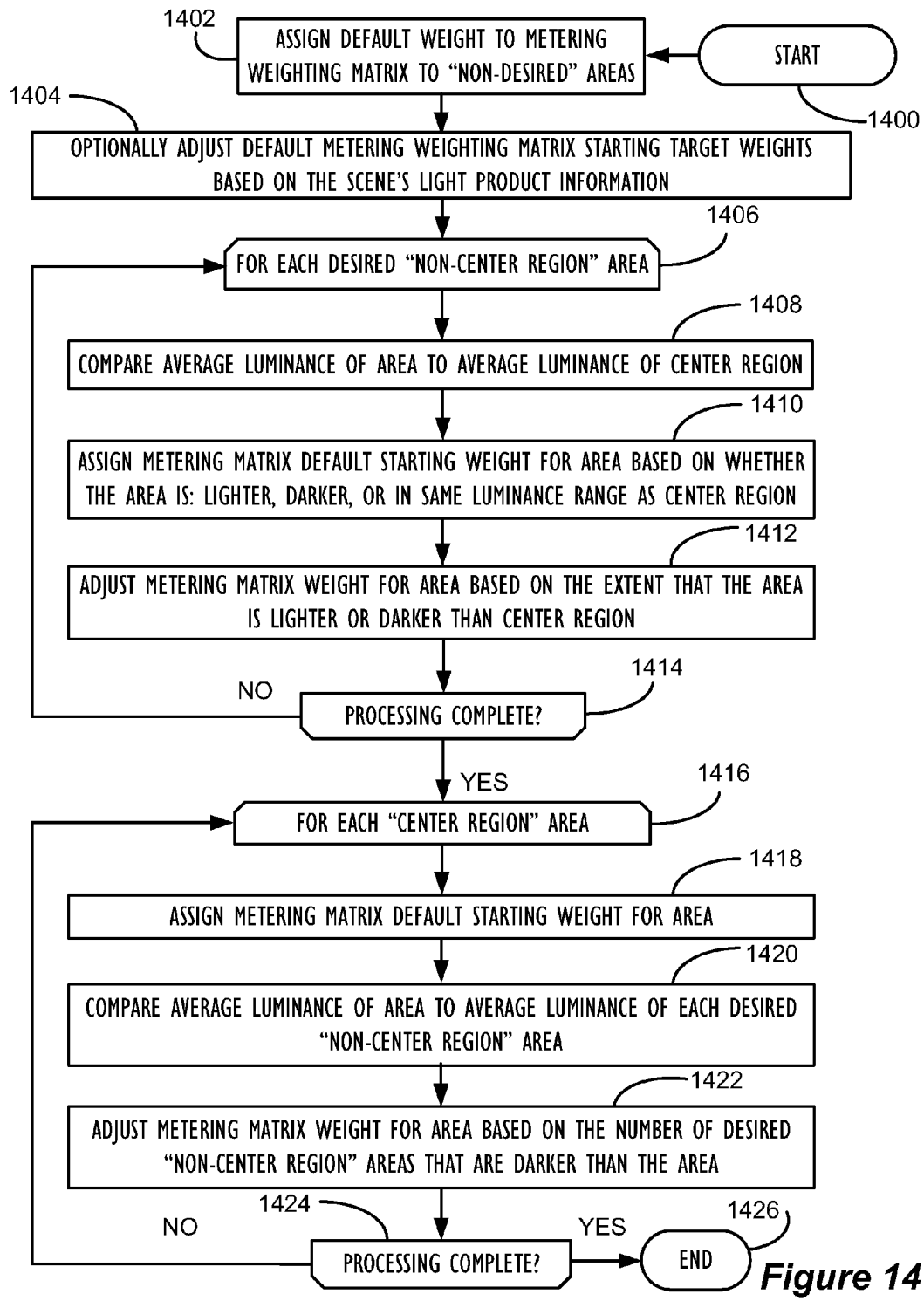
FIG. 14 illustrates, in flowchart form, one embodiment of a process for assigning and adjusting exposure metering region target weights in an exposure-independent, scene adaptive, dynamic auto exposure method, in accordance with one embodiment.

FIG. 14 illustrates, in flowchart form, one embodiment of a process for assigning and adjusting exposure metering region target weights in an exposure-independent, scene adaptive, dynamic auto exposure method, in accordance with one embodiment. First, the process begins at Step 1400. Next, the process generates a metering weighting matrix and assigns a default weight, e.g., zero, to the "non-desired" areas, i.e., regions in the scene that are not part of an exposure metering region or a central region (Step 1402). Next, the process optionally adjusts the default metering weighting matrix starting target weights based on the scene's light product information (Step 1404). Then, for each "non-center region" area that is part of the desired pattern (Step 1406), the process can compare the average luminance of the area to the average luminance of a center region(s) (Step 1408). Then, the process can assign a metering weighting matrix default starting weight for the area based on whether the area is lighter, darker, or in the same luminance range as the center region(s) (Step 1410) and adjust the assigned value based on the extent that the area is lighter or darker than the center region(s) (Step 1412), as was described above in relation to FIGS. 6-8. When the processing of the "non-center regions" is complete (Step 1414), the process may continue to processing the center region(s).

For each center region (Step 1416), the process may assign a metering weighting matrix default starting weight for the area (Step 1418). Then, after comparing the average luminance of the area to each of the "non-center region" areas (Step 1420), the process may adjust the metering weighting matrix default starting weight for the area based on the number of desired "non-center region" areas that are darker than the area (Step 1422), as was described above in relation to FIGS. 6-8. When the processing of the "center regions" is complete (Step 1424), the process may end (Step 1426).

Figure 15:
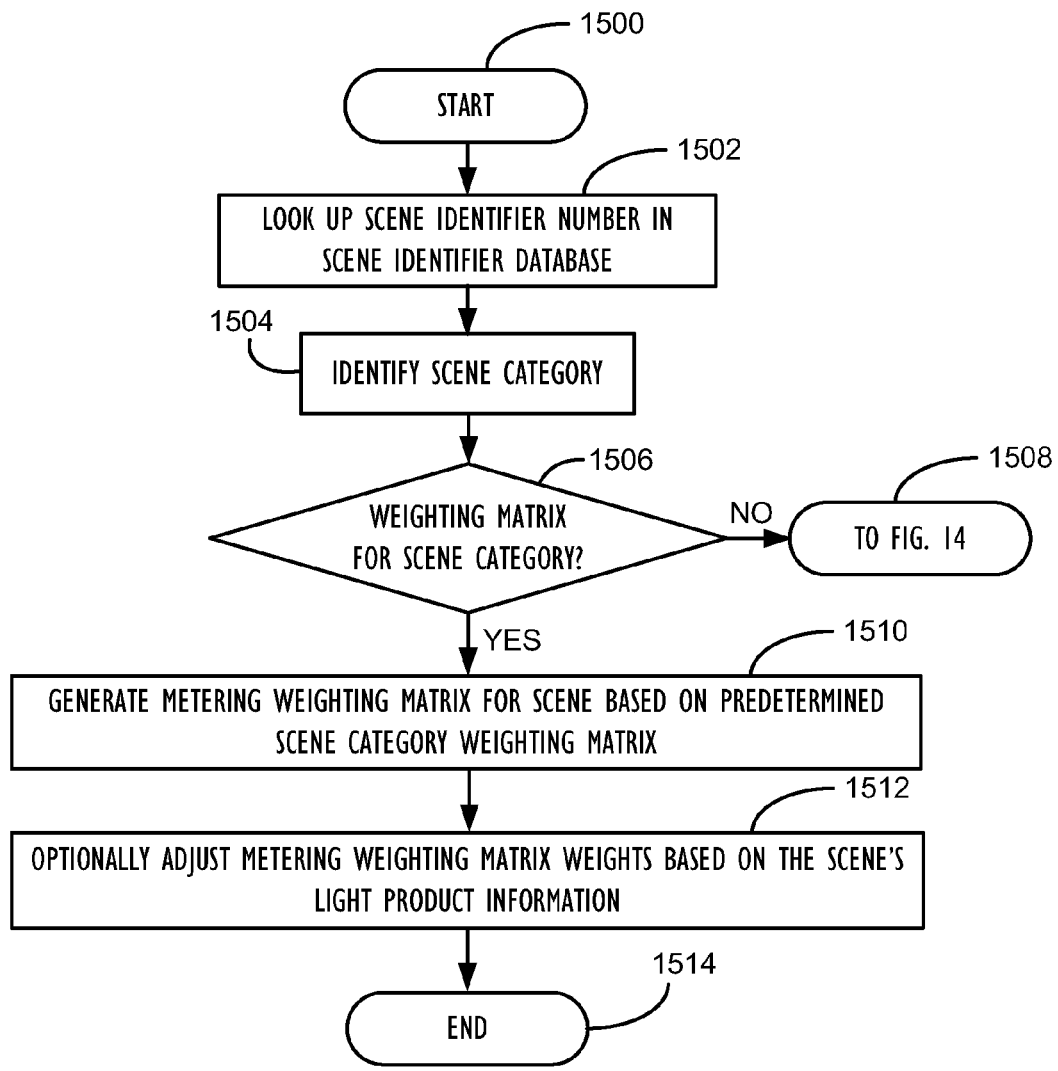
FIG. 15 illustrates, in flowchart form, another embodiment of a process for assigning and adjusting exposure metering region target weights in an exposure-independent, scene adaptive, dynamic auto exposure method, in accordance with one embodiment.

FIG. 15 illustrates, in flowchart form, one embodiment of a process for assigning and adjusting exposure metering region target weights in an exposure-independent, scene adaptive, dynamic auto exposure method, in accordance with one embodiment. In this embodiment, a scene identifier number is used to determine a scene category and apply a predetermined metering weighting matrix. First, the process begins at Step 1500. Next, the process looks up the scene identifier number in the scene identifier database (Step 1502). At that point, the process may identify a scene category from the scene identifier database that corresponds to the scene identifier (Step 1504). At this point, the process determines whether there is a predetermined metering weighting matrix for the identified scene category (Scene 1506). If there is not a predetermined metering weighting matrix for the identified scene category, the process can exit and proceed to the process illustrated in FIG. 14 (Step 1508) to generate a metering weighting matrix "algorithmically." If instead, there is a predetermined metering weighting matrix for the identified scene category, the process may generate a metering weighting matrix for the scene based on the predetermined metering weighting matrix stored in the scene identifier database (Step 1510). Next, the process may optionally adjust the metering weighting matrix target weights based on the scene's light product information (Step 1512). Finally the process may end and exit (Step 1514).

Figure 16:
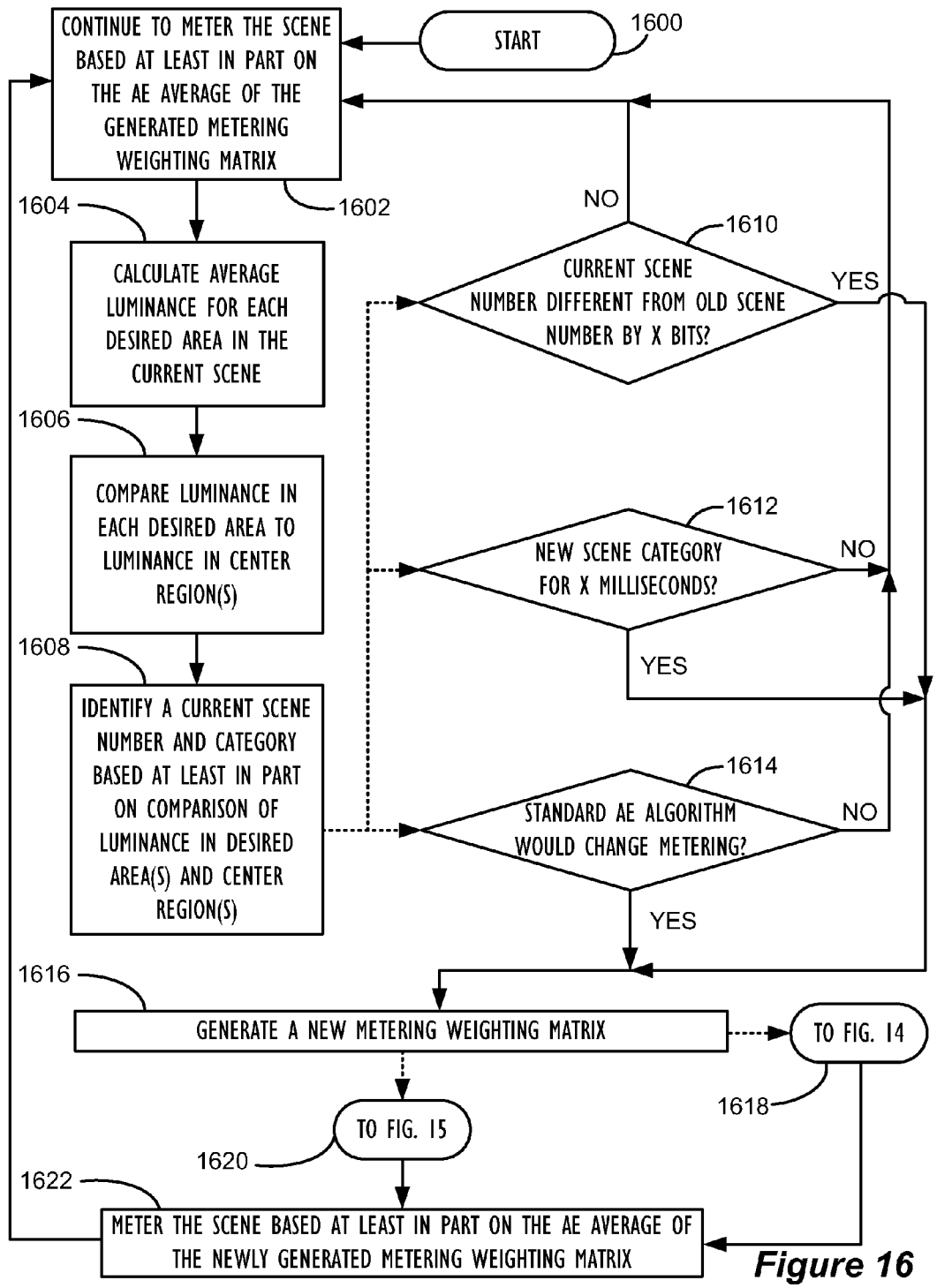
FIG. 16 illustrates, in flowchart form, one embodiment of a process for limiting exposure parameter values oscillations in a video application of an exposure-independent, scene adaptive, dynamic auto exposure method, in accordance with one embodiment.

FIG. 16 illustrates, in flowchart form, one embodiment of a process for preventing video oscillations in an exposure-independent, scene adaptive, dynamic auto exposure method, in accordance with one embodiment. First, the process begins at Step 1600. Next, the process continues to meter the scene based at least in part on the AE Average of the currently generated metering weighting matrix (Step 1602). Next, the process may calculate the average luminance for each desired area in the currently exposed scene (Step 1604). Similar to the description above in relation to FIGS. 5-8, the process may next compare the luminance in each desired area to the luminance in the center region(s) (Step 1606) and identify a current scene number and/or current scene category based at least in part on the comparison of luminance in the desired areas and the center region(s) (Step 1608). At this point, the process may use any one or more of optional oscillation criteria for determining when to generate a new metering weighting matrix and meter the scene based on a newly calculated AE Average. For example, the oscillation criteria, i.e., the condition(s) that must be satisfied in order for the process to initiate the generation of a new metering weighting matrix, may include: the current scene number is different from the previously calculated scene number by more than a predetermined number of bits, such as two bits (Step 1610); the current scene number corresponds to a different scene category than the previously determined scene category for more than a predetermined amount of time, such as 2000 milliseconds (Step 1612); or when a standard auto exposure algorithm would change the metering parameter values, such as when the overall average scene luminance differs from a predetermined AE Target value, e.g., an 18% gray value, by more than a threshold value (Step 1614). If the desired oscillation criterion is not met, the process may simply continue to meter the scene based at least in part on the AE Average of the currently generated metering weighting matrix (Step 1602). If instead, the desired oscillation criterion is met, the process may proceed to generate a new metering weighting matrix (Step 1616). At this point, the process may optionally proceed to practice the "algorithmic" auto exposure method of FIG. 14 (Step 1618) or the predetermined weighting matrix auto exposure method of FIG. 15 (Step 1620). Once the new metering weighting matrix has been generated, the process may proceed to update the metering parameter values and meter the scene based at least in part on the AE Average of the newly generated metering weighting matrix (Step 1622). Finally, the process may then go on to continue to meter the scene based at least in part on the newly-calculated AE Average of the newly generated metering weighting matrix (Step 1602).

Figure 17:
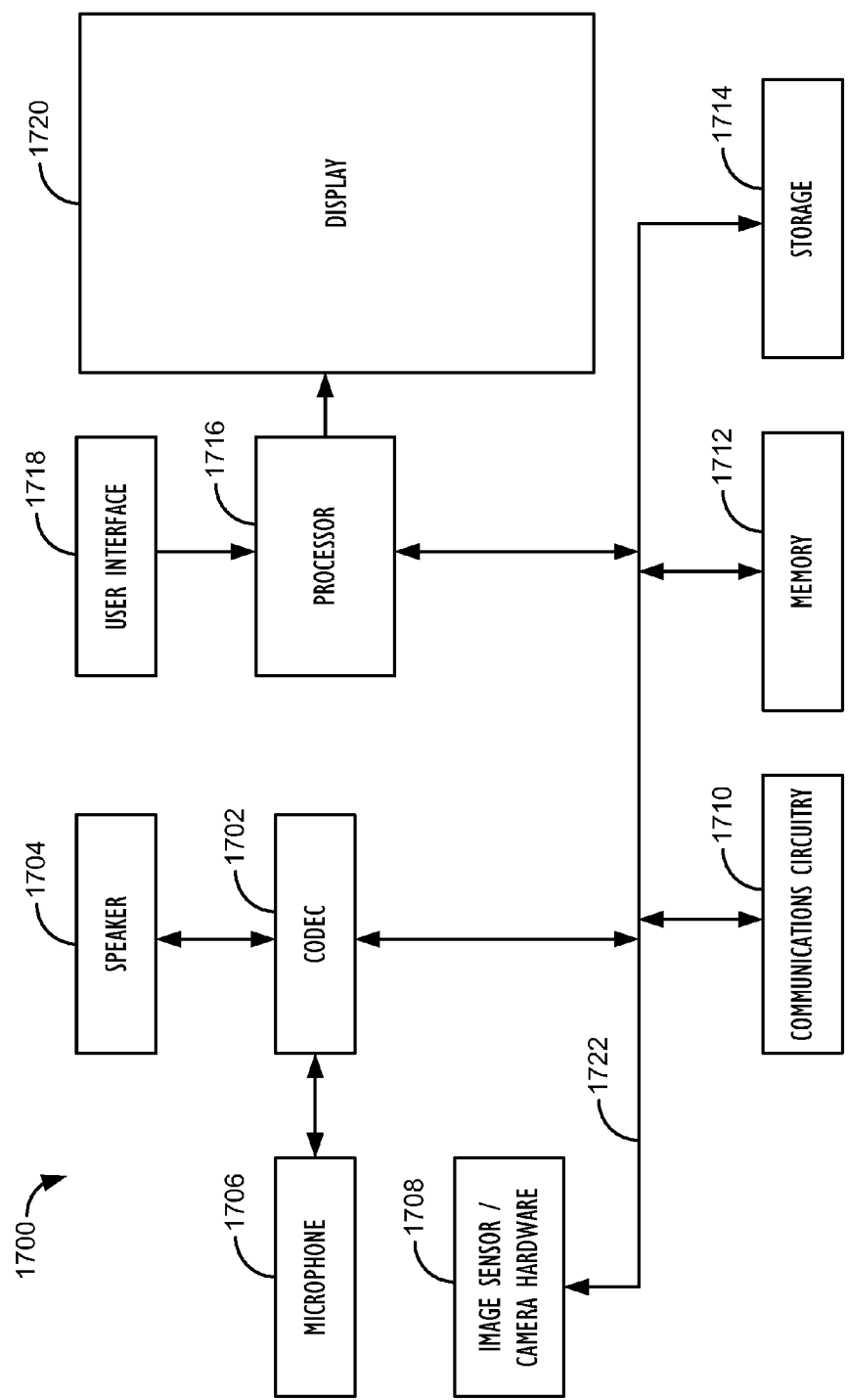
FIG. 17 illustrates a simplified functional block diagram of a personal electronic device, in accordance with one embodiment.

Referring now to FIG. 17, a simplified functional block diagram of a representative personal electronic device 1700 according to an illustrative embodiment, e.g., a mobile phone possessing a camera device such as camera device 208, is shown. The personal electronic device 1700 may include a processor 1716, storage device 1714, user interface 1718, display 1720, coder/decoder (CODEC) 1702, bus 1722, memory 1712, communications circuitry 1710, a speaker or transducer 1704, a microphone 1706, and an image sensor with associated camera hardware 1708. Processor 1716 may be any suitable programmable control device and may control the operation of many functions, such as the scene adaptive auto exposure algorithm discussed above, as well as other functions performed by personal electronic device 1700. Processor 1716 may drive display 1720 and may receive user inputs from the user interface 1718.

Storage device 1714 may store media (e.g., photo and video files), software (e.g., for implementing various functions on device 1700), preference information (e.g., media playback preferences), personal information, and any other suitable data. Storage device 1714 may include one more storage mediums, including for example, a hard-drive, permanent memory such as ROM, semi-permanent memory such as RAM, or cache.

Memory 1712 may include one or more different types of memory which may be used for performing device functions. For example, memory 1712 may include cache, ROM, and/or RAM. Bus 1722 may provide a data transfer path for transferring data to, from, or between at least storage device 1714, memory 1712, and processor 1716. CODEC 1702 may be included to convert digital audio signals into analog signals for driving the speaker 1704 to produce sound including voice, music, and other like audio. The CODEC 1702 may also convert audio inputs from the microphone 1706 into digital audio signals for storage in memory 1712 or storage 1714. The CODEC 1702 may include a video CODEC for processing digital and/or analog video signals.

User interface 1718 may allow a user to interact with the personal electronic device 1700. For example, the user input device 1718 can take a variety of forms, such as a button, keypad, dial, a click wheel, or a touch screen. Communications circuitry 1710 may include circuitry for wireless communication (e.g., short-range and/or long range communication). For example, the wireless communication circuitry may be Wi-Fi® enabling circuitry that permits wireless communication according to one of the 802.11 standards. (Wi-Fi® is a registered trademark of the Wi-Fi Alliance.) Other wireless network protocols standards could also be used, either as an alternative to the identified protocols or in addition to the identified protocols. Other network standards may include BLUETOOTH®, the Global System for Mobile Communications (GSM®), and code division multiple access (CDMA) based wireless protocols. (BLUETOOTH® is a registered trademark of Bluetooth SIG, Inc., and GSM® is a registered trademark of GSM Association.) Communications circuitry 1710 may also include circuitry that enables device 1700 to be electrically coupled to another device (e.g., a computer or an accessory device) and communicate with that other device.

In one embodiment, the personal electronic device 1700 may be a personal electronic device dedicated to processing media such as audio and video. For example, the personal electronic device 1700 may be a media device such as media player, e.g., an MP3 player, a game player, a remote controller, a portable communication device, a remote ordering interface, an audio tour player, or other suitable personal device. The personal electronic device 1700 may be battery-operated and highly portable so as to allow a user to listen to music, play games or video, record video, stream video, take pictures, communicate with others, and/or control other devices. In addition, the personal electronic device 1700 may be sized such that it fits relatively easily into a pocket or hand of the user. By being handheld, the personal computing device 1700 may be relatively small and easily handled and utilized by its user and thus may be taken practically anywhere the user travels.

As discussed previously, the relatively small form factor of certain types of personal electronic devices 1700, e.g., personal media devices, enables a user to easily manipulate the device's position, orientation, and movement. Accordingly, the personal electronic device 1700 may provide for improved techniques of sensing such changes in position, orientation, and movement to enable a user to interface with or control the device 1700 by affecting such changes. Further, the device 1700 may include a vibration source, under the control of processor 1716, for example, to facilitate sending motion, vibration, and/or movement information to a user related to an operation of the device 1700. The personal electronic device 1700 may also include an image sensor and associated camera hardware 1708 that enables the device 1700 to capture an image or series of images, i.e., video, continuously, periodically, at select times, and/or under select conditions.

The foregoing description is not intended to limit or restrict the scope or applicability of the inventive concepts conceived of by the Applicants. As one example, although the present disclosure focused on scene adaptive solutions for driving camera exposure parameters based on exposure-independent parameters; it will be appreciated that the teachings of the present disclosure can be applied to other contexts, e.g.: driving the shape of tone mapping curves, gamma correction curves, flash brightness levels, or other custom image settings based at least in part on exposure-independent scene adaptive categorization. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A scene adaptive auto exposure system comprising:
   an image sensor for capturing an image representative of a scene;
   a memory coupled to the image sensor; and
   a programmable control device communicatively coupled to the image sensor and the memory, wherein the memory includes instructions for causing the programmable control device to perform a scene adaptive auto exposure method on image information received from the image sensor, the method comprising:
      defining a first exposure metering region over a desired area of the image;
      defining a plurality of second exposure metering regions, wherein each second exposure metering region covers a desired area of the image;
      comparing a value for each of the second exposure metering regions to a value for the first exposure metering region;
      determining a scene identifier based on the compared values;
      determining a metering value for the scene based at least in part on the determined scene identifier; and
      setting an exposure parameter for the image sensor based at least in part on the determined metering value.

2. The scene adaptive auto exposure system of claim 1, wherein the programmed act of determining a metering value for the scene further comprises determining a scene category corresponding to the scene determined scene identifier.

3. The scene adaptive auto exposure system of claim 2, wherein the programmed act of determining a metering value for the scene further comprises selecting a predetermined metering weighting matrix corresponding to the determined scene category.

4. The scene adaptive auto exposure system of claim 1, wherein the programmed act of determining a metering value for the scene further comprises calculating a weighted average value for the scene.

5. The scene adaptive auto exposure system of claim 1, wherein the programmed act of setting an exposure parameter for the image sensor based at least in part on the determined metering value comprises comparing the determined metering value to a predetermined metering target value.

6. The scene adaptive auto exposure system of claim 1, wherein the value that is compared for each of the second exposure metering regions and the first exposure metering region comprises an average luminance value over the exposure metering region.

7. The scene adaptive auto exposure system of claim 1, wherein the programmed act of determining a scene identifier comprises:
generating a binary value for each comparison of a value for a second exposure metering region to a value for the first exposure metering region; and
concatenating each of the generated binary values into a single binary value sequence, wherein the sequence of binary values comprises the scene identifier.

8. The scene adaptive auto exposure system of claim 1, wherein the first exposure metering region comprises a central exposure metering region, and wherein the plurality of second exposure metering regions comprise a ring of peripheral exposure metering regions surrounding the first exposure metering region.

9. The scene adaptive auto exposure system of claim 1, wherein the programmed act of setting an exposure parameter for the image sensor is configured to occur only when a predetermined oscillation criterion is satisfied.

10. A scene adaptive auto exposure system comprising:
an image sensor for capturing an image representative of a scene;
a memory coupled to the image sensor; and
a programmable control device communicatively coupled to the image sensor and the memory, wherein the memory includes instructions for causing the programmable control device to perform a scene adaptive auto exposure method on image information received from the image sensor, the method comprising:
defining a first exposure metering region over a desired area of the image;
defining a plurality of second exposure metering regions, wherein each second exposure metering region covers a desired area of the image;
comparing a value for each of the second exposure metering regions to a value for the first exposure metering region;
assigning a target weight value to each of the plurality of second exposure metering regions based on the outcome of the comparison of the value for the second exposure metering region to the value for the first exposure metering region;
determining a metering value for the scene based at least in part on a calculated weighted average value for the scene; and
setting an exposure parameter for the image sensor based at least in part on the determined metering value.

11. The scene adaptive auto exposure system of claim 10, wherein the programmed act of determining a metering value for the scene further comprises assigning a target weight value to the first exposure metering region based on comparisons of the value for the first exposure metering region to the value for the second exposure metering regions.

12. The scene adaptive auto exposure system of claim 11, wherein the programmed act of determining a metering value for the scene further comprises assigning a target weight value to areas of the image that are not part of either the first exposure metering region or the second exposure metering regions.

13. The scene adaptive auto exposure system of claim 11, wherein the programmed act of determining a metering value for the scene further comprises adjusting the target weight value of the first exposure metering region based on the number of second exposure metering regions having a value that is greater than the value of the first exposure metering region.

14. The scene adaptive auto exposure system of claim 11, wherein the programmed act of determining a metering value for the scene further comprises adjusting the target weight values of the second exposure metering regions according to a weighting mapping function.

15. The scene adaptive auto exposure system of claim 12, wherein the calculated weighted average value comprises an average of the values for each of the exposure metering regions, wherein the value for each exposure metering region is weighted according to the region's assigned target weight value.

16. The scene adaptive auto exposure system of claim 10, wherein the programmed act of setting an exposure parameter for the image sensor is configured to occur only when a predetermined oscillation criterion is satisfied.

17. A method of auto exposing a physical scene comprising:
receiving from an image sensor image information representative of the physical scene and comprising a plurality of pixels;
defining exposure metering regions over two or more desired areas within the physical scene, wherein each region comprises a subset of the plurality of pixels;
determining a metering value for the physical scene based at least in part on a comparison of luminance values of pixels in a first exposure metering region to luminance values of pixels in a second exposure metering region, wherein the act of determining a metering value comprises assigning a target weight value to at least one of the defined exposure metering regions; and
setting an exposure parameter for the image sensor based at least in part on the determined metering value.

18. The method of claim 17, wherein the value of the target weight value assigned to a defined exposure metering region comprises:
a first target weight value if the first exposure metering region is lighter than the second exposure metering region,
a second target weight value if the first exposure metering region is within a threshold value of the luminance of the second exposure metering region, and
a third target weight value if the first exposure metering region is darker than the second exposure metering region.

19. The method of claim 18, wherein the first target weight value is smaller than the second target weight value.

20. The method of claim 17, further comprising the act of adjusting the value of at least one of the assigned target weight values, wherein the act of adjustment comprises applying a weighting mapping function.

21. The method of claim 17, wherein the defined exposure metering regions comprise a ring of peripheral exposure metering regions around a central exposure metering region.

22. The method of claim 21, wherein the first exposure metering region comprises one of the ring of peripheral exposure metering regions and the second exposure metering region comprises the central exposure metering region.

23. A computer usable medium having a computer readable program code embodied therein, wherein the computer readable program code is adapted to be executed to implement the method of claim 17.

24. A method of auto exposing a physical scene comprising:
- receiving from an image sensor image information representative of the physical scene and comprising a plurality of pixels;
- defining a pattern of exposure metering regions over two or more desired areas within the physical scene, wherein each area comprises a subset of the plurality of pixels;
- comparing an average luminance value of pixels in a first exposure metering region to an average luminance value of pixels in a second exposure metering region;
- determining a scene category based on the outcome of the compared average luminance values;
- selecting a predetermined metering weighting matrix corresponding to the determined scene category, wherein the metering weighting matrix comprises a target weight value for each exposure metering region; and
- setting an exposure parameter for the image sensor based at least in part on the target weight values in the selected predetermined metering weighting matrix.

* * * * *